US012770624B2

(12) United States Patent
Torok et al.

(10) Patent No.: US 12,770,624 B2
(45) **Date of Patent: *Oct. 20, 2026**

(54) COOPERATION BETWEEN LANGUAGE MODELS EACH ASSOCIATED WITH AN AGENT TO PROCESS MULTITASK INPUT DATA

(71) Applicant: Amazon Technologies, Inc., Seattle, WA (US)

(72) Inventors: Fred Torok, Mercer Island, WA (US); Idris Abbas Saylawala, Los Gatos, CA (US); Frederic J Deramat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/759,176

(22) Filed: Jun. 28, 2024

(65) Prior Publication Data

US 2026/0004786 A1 Jan. 1, 2026

(51) Int. Cl.

| | |
|---|---|
| ***G10L 15/30*** | (2013.01) |
| ***B60R 16/037*** | (2006.01) |
| ***G06F 16/23*** | (2019.01) |
| ***G10L 15/183*** | (2013.01) |
| ***G10L 21/02*** | (2013.01) |

(52) U.S. Cl.

CPC ............ *G10L 15/30* (2013.01); *G10L 15/183* (2013.01); *B60R 16/037* (2013.01); *G06F 16/23* (2019.01); *G10L 21/02* (2013.01)

(58) Field of Classification Search

CPC .................................................... B60R 16/037
USPC .......................................................... 704/257
See application file for complete search history.

(56) References Cited

U.S. PATENT DOCUMENTS

| | | | | |
|---|---|---|---|---|
| 11,763,809 | B1 | 9/2023 | Bobbili et al. | |
| 2025/0284561 | A1* | 9/2025 | Yang | G06F 9/5088 |

FOREIGN PATENT DOCUMENTS

| | | | | |
|---|---|---|---|---|
| KR | 20240174724 | * | 6/2023 | B60R 16/037 |

OTHER PUBLICATIONS

International Search Report and Written Opinion mailed on Aug. 12, 2025 for International Patent Application No. PCT/US2025/029961, filed May 19, 2025.

Non-Final Office Action for U.S. Appl. No. 18/759,147, mailed on Apr. 17, 2026, 19 pages.

* cited by examiner

*Primary Examiner* — Farzad Kazeminezhad
(74) *Attorney, Agent, or Firm* — Pierce Atwood LLP

(57) ABSTRACT

A system may be configured for cooperation between language model agents. An agent may be, for example, a computer system, or a software component executing on a computer system, that can accept text and/or natural language inputs, draw upon an LM to process the inputs and perform a function, and respond via text and/or natural language outputs. An agent may act as a mediator to interact with a user, identify a task requested by the user, and delegate one or more subtasks to another agent or other resource. An agent may act as a delegate to handle tasks or subtasks delegated by a mediator. Agents may communicate with each other using a combination of structured and unstructured language; for example, one or more parameters and a natural language message.

20 Claims, 14 Drawing Sheets

COOPERATION BETWEEN LANGUAGE MODELS EACH ASSOCIATED WITH AN AGENT TO PROCESS MULTITASK INPUT DATA

BACKGROUND

Natural language processing systems have progressed to the point where humans can interact with computing devices using their voices and natural language textual input. Such systems employ computing techniques to identify words spoken and written by a human user based on the various qualities of received input data. Speech recognition combined with natural language understanding processing techniques enable speech-based user control of computing devices to perform tasks based on the user's spoken or other natural language inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
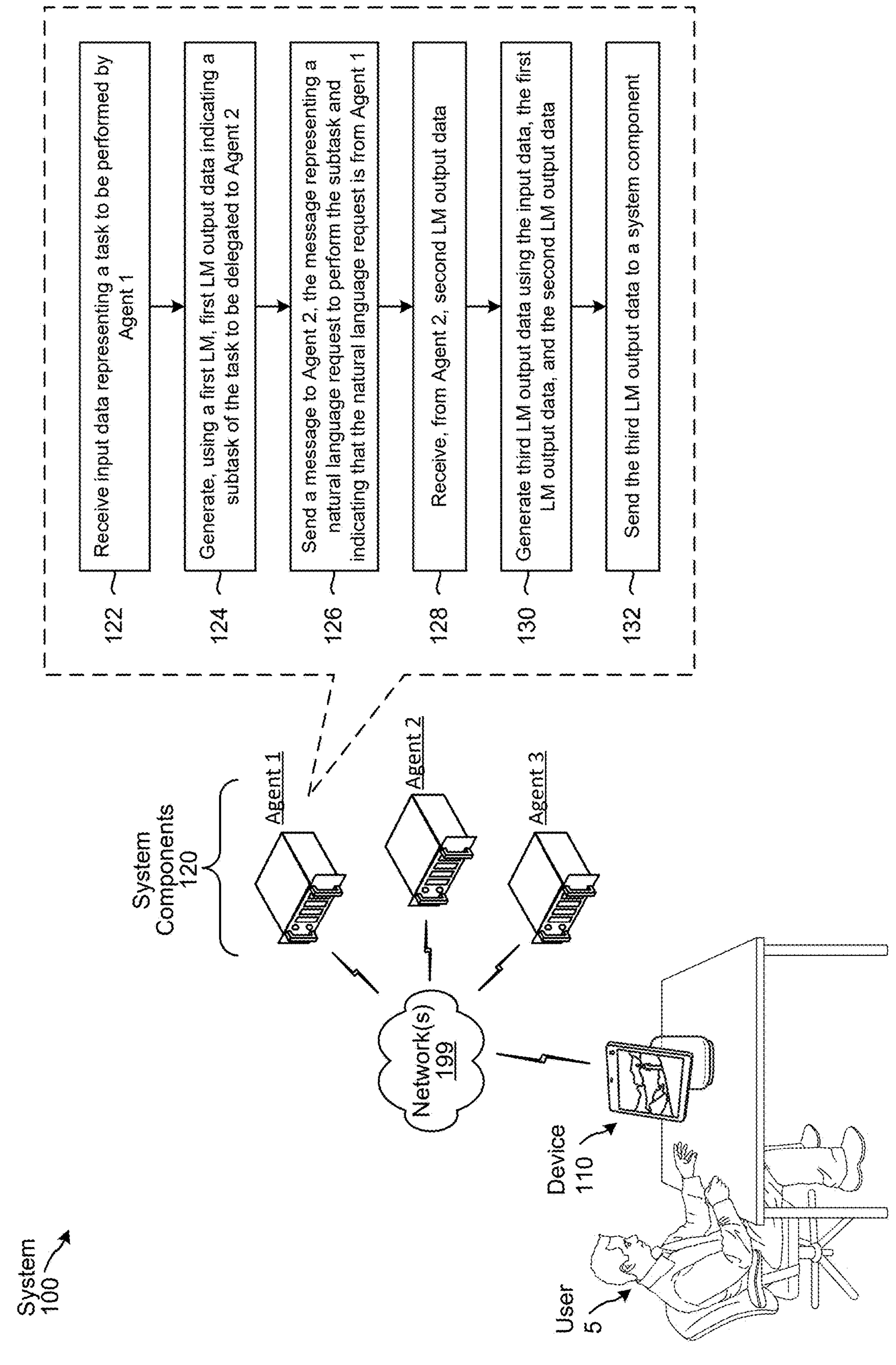
FIG. 1A is a conceptual diagram illustrating operations of a mediator language model (LM) agent in a multi-agent system, according to embodiments of the present disclosure.

Natural language processing (NLP) is a field of computer science, artificial intelligence, and linguistics concerned with processing a user command input in the form of a natural human language (e.g., English, Chinese, etc.). Such a natural language command may come in the form of audio, text, image, or other format. Natural language processing may involve a number of different specific processing techniques such as those discussed below. Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Speech synthesis generation (SSG) (sometimes referred to as text-to-speech or TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech (S2S) is a field of computer science, artificial intelligence, and linguistics in which embedding data is generated to represent human speech in audio data and, using one or more models, the embedding data is processed to generate audio data (synthetic speech) and/or a system (e.g., API) command responsive to the input human speech. Language modeling is the use of various statistical and probabilistic techniques to determine the probability of a given sequence of words occurring next to each other and with proper grammatical syntax (e.g., proper sentence formation). Language modeling can be used to perform various tasks including understanding a natural language input and performing generative tasks that involve generating natural language output data. These and other technologies may be used individually and/or in combination as part of a speech-processing system such as a virtual assistant or chatbot.

Language modeling may be performed by a language model ("LM") such as a large language model. An LM is an advanced artificial intelligence system designed to process, understand, and generate human-like text (and/or other data types) based on relatively large amounts of data. An LM may be built using deep learning techniques, such as neural networks, and may be trained on extensive datasets that include content from a broad range of sources, such as old/permitted books and websites, for natural language processing. An LM may be trained using an expansive training dataset and may include a large number of parameters (in the range of billions, trillions, or more); hence, LMs may sometimes be referred to as "large" language models.

In some implementations, an LM may be based on a transformer architecture having an encoder and/or decoder. The LM may operate in a sequence-to-sequence manner in which it extracts information from tokens (or other data type) of the input sequence as well as their positions relative to each other. Likewise, the model can reflect the extracted information in both the selection and ordering of tokens in the output sequence. In some implementations, an LM may operate autoregressively. For example, a transformer decoder may generate a sequence of output tokens based on the input data (e.g., a prompt) and previously predicted output tokens.

As LMs increase in complexity and improve in function, they become capable of performing complex tasks (e.g., made up of sequential subtasks that may call upon external resources). For example, a user may pose a question using natural language (e.g., normal human speech), and a computer system may draw upon an LM to understand the question, leverage resources to obtain information and/or to perform an action, and generate a natural language response to the user.

A computer system, or a software component executing on a computer system, that accepts text and/or natural language inputs, draws upon an LM to process the inputs and perform a function, and responds via text and/or natural language outputs, may be referred to as an "agent." An agent may be configured to use an external resource to obtain information and/or effect an action in response to an input. The agent may communicate with a resource via, for example, an application programming interface (API). An API is a software interface that allows computer programs or components to communicate with each other. An API specification describes how to call the API to access a tool or service of the API. An agent may be configured to generate an API call to access a resource such as a tool, service, and/or another agent. Different APIs may have different specifications, so each time a new resource is added to the system or otherwise made available to the agent, the agent may be updated to use the new API's specification and/or the resource may be configured to conform to a standard or preexisting API specification.

Offered herein are techniques for implementing cooperation between agents using an exchange of text and/or natural language. An agent may communicate using messages that include a combination of one or more predefined parameters and information (such as a question, answer, request, response, etc.) conveyed in natural language. As used herein, the term "agent" refers a software component that encapsulates a function, has a text-in/text-out interface, and draws upon an LM. The concept of an agent does not have a predefined scope—an agent may be general purpose or may correspond to a niche specialty (e.g., configured to answer questions about a particular area of knowledge). In some cases, the LM and/or the agent may receive and generate other modes of data such as speech audio. Cooperating agents may exchange messages that include a combination of structured and unstructured portions. For example, a message may contain certain parameters representing, for example, the requesting entity (e.g., user or agent), the nature of the message (e.g., whether an initial request, a request for more information, a response to previous message, etc.), and other parameters described herein. An unstructured portion of a message may include a natural language command, question, answer, request, response, etc. Thus, an agent may communicate with another agent using natural language similar to the way a human would communicate with an agent; for example, using natural language and without a need for a purpose-built API. This may promote the scalability of a system that includes many and/or frequently changing agents and resources.

In some cases, inter-agent cooperation may occur between two agents. One or both of these agents may be user facing. Each agent may, however, correspond to different knowledge, capabilities, responsibilities, etc. For example, a user may interact with both the Amazon Alexa virtual assistant and a household robot (e.g., a motile device), each of which acting as an agent (Alexa or Robot, respectively). In an example interaction, a user may say to the robot: "Robot, move to the living room and turn off the lights." The system may detect the "Robot" wakeword and thus route the utterance to Robot. Robot may process the utterance and determine that the task includes two subtasks: moving to the living room and turning off the light. Robot can move itself to the living room, but may not be capable of turning off the lights. Robot may thus delegate this subtask to Alexa, which may have access to smart home resources. To handle the subtask delegated to it, Alexa may need more information; in particular, the identity of the light to turn off. Robot may identify the light proactively or in response to a message from Alexa asking which light to turn off. This task also involves the passage of time, as the robot cannot relocate instantaneously. Thus, the cooperation may involve determining a condition and an action to be performed upon detecting the condition at some point in the future. In this example, Robot may detect the triggering event (e.g., the robot arriving in the living room) and Alexa may perform the action.

In some cases, inter-agent cooperation may occur between a general-purpose agent and multiple purpose-built or specialty agents. For example, a user may interact with Alexa for a variety of purposes corresponding to, for example, different domains of knowledge, different online systems (e.g., banking, shopping, apps, etc.), and/or different systems in the physical world (e.g., household robots, appliances, smart-home or smart-vehicle devices, smart speakers or televisions, etc.). In such cases, Alexa may act as a mediator agent. The mediator agent may receive a user command, identify a task, decompose the task into subtasks, delegate one or more of the subtasks to other resources (e.g., other agents or tools), observe the results, and generate a response to the user.

As used herein, when an agent delegates a task or subtask, the delegating agent may be referred to as a mediator agent and the delegee may be referred to as the delegate agent. These labels are used merely to indicate the role of a particular agent in a particular scenario. The roles need not be static or strictly defined and in fact may change from one user interaction to another and even during a single user interaction. For example, the user may invoke a first agent, who delegates the task to a second agent. In delegating the task, the first agent may retain control (e.g., such that it handles further communication with the user including providing a response) or relinquish control (e.g., such that the delegate agent handles further communications with the user). In some cases, the second agent may ask the first agent for information needed to perform the task; thus, the role of mediator and delegate may reverse for purposes of obtaining that information. In some implementations, one or more agents may be configured with a mechanism to prevent a delegation loop in which a first agent delegates to a second agent who delegates back to the first, and so on. Furthermore, in some cases, either the mediator or the delegate may be a non-LM-based computer system or software component. For example, a software module or component may generate a message to delegate a task to an agent.

Similarly, an agent may generate API calls (or other type of communication) to interact with a non-LM-based resource such as a database, knowledge graph, calculator, etc. An agent (either a mediator, delegate, or otherwise) may leverage various other tools to perform tasks and subtasks including, but not limited to, a large action model (LAM), robotic process automation (RPA), API tool, math tool, SQL tool, routines tool, etc., as described further herein.

In some cases, an agent may be configured to operate proactively. For example, a proactive agent may initiate an interaction with a user (and/or another resource) upon detection of a particular event. In some cases, such a proactive agent may detect a trigger and notify the user and/or perform some predetermined/pre-requested action. In some cases, the proactive agent may automatically scan for the occurrence of an event and/or presence of a condition periodically or occasionally, and act accordingly.

In some cases, the user may ask an agent to perform complex tasks (e.g., involving multiple steps). For example, the user may ask the agent to perform speaker-attributed speech recognition. The user may provide the agent with audio data representing a conversation between two or more speakers and audio data representing speech samples of the speaker(s). The agent may generate a transcript of the dialog with labels indicating who said what. In another example, the user may ask the agent a question, then ask the agent to identify one or more scholarly publications on the topic, and evaluate its previous answer against the substance of the publication(s). The user may ask the agent to perform automated tasks; that is, potentially without contemporaneous user control. The user may request the agent to perform one or more actions at a specified future time and/or in response to a triggering event. For example, the user may ask the agent to watch for an item to go on sale, and purchase a particular quantity if a threshold discount is reached. The user may ask the agent may interact with a voice user interface (VUI) on the user's behalf. The agent may generate synthesized speech for input to the VUI and/or may transcribe speech outputs of the VUI. For example, the user could ask the LAM to navigate an automated telephone system. The LAM may allow an individual who is hearing impaired to interact with the VUI using text.

Although LMs include combinations of computer models and computer software, some LMs have the capability to perform processing analogous to reflection and reasoning. For example, reflection involves asking an LM to evaluate its own output or the output of another LM or agent. This may improve the quality of the LM's output if the LM identifies weaknesses or errors its previous answer. Reasoning involves prompting the LM being to consider what to do in response to a question or command. The LM may perform such reasoning to determine whether and how to act to handle an input, whether by leveraging an external agent or tool, taking some other action, or generating a user response immediately. This may break the overall task down into subtasks that the LM can perform (or cause to be performed by leveraging resources) sequentially. A framework for prompting an LM to decompose a task into a sequence of subtasks is chain-of-though prompting. A framework for prompting an LM to identify resources to leverage to perform subtasks is the ReAct framework (a portmanteau of "reason" and "act"). A ReAct prompt may instruct an LM to analyze an input to identify a question, and step through the process of generating an answer. An example ReAct prompt may have the following structure:

Answer the following questions as best you can. You have access to the following tools:

Calculator: Useful for when you need to answer questions about math.

Stock DB: Useful for when you need to answer questions about stocks and their prices.

Use the following format:

Question: the input question you must answer

Thought: you should always think about what to do

Action: the action to take, should be one of [Calculator, Stock DB]

Action input: the input to the action

Observation: the result of the action

. . . (this Thought/Action/Action Input/Observation can repeat N times)

Thought: I know the final answer

Final Answer: the final answer to the original input question

Begin!

The ReAct prompt may be followed by a question: "Question: what is two to the power of seventeen?" The LM may produce (e.g., in the form of tokens representing text) a "thought." The thought may be: "Thought: This is a simple mathematical calculation. I can use the Calculator to calculate this." The LM may produce an action: "Action: Calculator," and an input to that action: "Action Input: calculate 2^17."

In absence of providing the prompt prior to the question, the LM may begin generating tokens representing a response (e.g., "The answer to your question is . . . ") without engaging the Calculator, and thus generate a numerical answer that would likely be incorrect. The prompt, however, causes the LM to stop generating tokens and determine to delegate the calculation to the Calculator resource. When the Calculator returns the Observation (e.g., the numerical answer to the calculation: 131,072), the LM may be invoked again to complete generating the response using the number returned by the Calculator. The user may receive the response as an output of the computer system (e.g., text on a display and/or speech output by a loudspeaker). If the question originated from another agent, the LM may generate a message to send to the other agent.

In some cases, the task may include repeating reasoning and action steps, as indicated in the example prompt above. In some cases, the agent may determine that it needs more information to answer the question. In another example, the prompt above may be followed by a question: "What was the average stock price over the past week, month, and quarter?" The LM may produce a "thought." The thought may be: "Thought: This is a mathematical calculation based on a time-series of stock prices. I can retrieve the stock prices from Stock DB. To retrieve the stock prices, I need to know the company name." The LM may produce an action: "Action: Ask User for the company name." Upon receiving an answer from the user, the agent may prompt the LM again with the company name. The LM may produce an action leveraging Stock DB for the stock prices. As in the previous example, the LM may produce an action leveraging Calculator to determine the requested averages, and generate a response to the user with the result.

The prompt above may be expanded by giving the agent further information about the resources available to it and how to use them. For example, in a dynamic multi-agent environment, new agents and/or resources may come online. In addition, existing agents and/or resources may undergo updates that expand their capabilities. Thus, in some cases, the prompt may include a listing of available resources and their respective capabilities. In some cases, the prompt may include instructions for how an agent can obtain a current listing of available resources/capabilities. In some cases, the prompt may include instructions for how to discover new resources and how to communicate with a new resource to obtain its capabilities.

The prompt may be expanded to specify schema for incoming and outgoing messages. For example, the prompt may inform an agent that an incoming message may include a parameter indicating whether the message originated from a user or another agent. The prompt may instruct the agent how to format outgoing messages. The outgoing message may include a parameter indicating the sending and/or receiving agent. If the message delegates a task, the message may include a parameter indicating whether the delegating agent wishes to retain or relinquish control of the interaction. If the message is in response to receiving a delegated task, the message may include a parameter indicating that the delegate is responding with a direct answer, by delegating to a different agent, requesting more information, unable to answer, etc. Further message schema may be provided for additional message types, such as responding to a response received from a delegate (e.g., to accept/reject the response, obtain more information from the delegate, etc.). In each case, a message may include one or more natural language portions that convey information. Thus, the prompt may include instructions for how the natural language portion(s) should be phrased (e.g., "thought": "<explain your reasoning>", "answer": "<your answer>").

These techniques may be implemented alone or in combination with each other and/or other features of the systems and methods described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating operations of a mediator language model (LM) agent in a multi-agent system 100, according to embodiments of the present disclosure. As used herein, the term "agent" refers a software component that encapsulates a function, has a text-in/text-out interface, and draws upon an LM. Although in various example operations described herein an agent may be described as "mediator" or "delegate," such labels are used merely to indicate the role of a particular agent in a particular scenario. The roles need not be static or strictly defined, and in fact may change from one user interaction to another and even during a single user interaction. Furthermore, when an agent acts as a mediator, it may delegate a task or subtask to a non-LM resource (e.g., an API, tool, service, etc.). Similarly, when an agent acts as a delegate, it may receive a delegated task or subtask from a non-LM actor (e.g., a computer and/or software component).

The system 100 may include a user device 110, such as speech-detection device with display 110*f* pictured, and one or more system components 120 in communication via one or more computer networks 199. In some implementations, the user device 110 may be a motile device 110*k* (e.g., a household robot). Although FIG. 1A shows each system component 120 corresponding to a single agent, the system 100 is not so limited. The functions of one or more agents may be performed by a single system component 120. Similarly, the functions of an agent may be divided and/or duplicated between multiple system components 120 and/or the user device 110. The user 5 may interact with the user device 110 by various means including by using natural language speech and/or text. In various implementations, the user device 110 may be any one of the user device illustrated in FIG. 8, and may include hardware components as described below with reference to FIG. 6. In some implementations, the user device 110 may operate in conjunction with one or more of the system components 120. A system component 120 may include hardware components as described below with reference to FIG. 7.

The user 5 may interact with an agent via the user device 110. In the example operations shown in FIG. 1A, Agent 1 may act as a mediator. Agent 1 may receive commands from the user 5 and respond and/or act accordingly. In doing so, Agent 1 may call upon other resources to, for example, obtain information it does not have, perform an action it cannot perform itself, etc. The resources may include a delegate LM represented by, for example, Agent 2 as described below with reference to FIG. 1B. In some implementations, the resources may additionally include a large action model (LAM), and/or various tools such as an application programming interface (API) tool, math tool, etc., as will be described further below. An agent may be configured to communicate with the various resources. An agent may communicate with another agent via messages made up of a combination of structured and unstructured language. The agent may be configured to use certain specific parameters to indicate the type of message (e.g., a request, response, etc.) and/or how the receiving agent should handle the message. For example, the mediator agent may send a message to a delegate agent with parameters indicating that the message is from another agent, and that the requesting agent retains control of the user interaction. The agent may convey the substance of the message using natural language. For example, the agent may include a natural language question, request, command, etc. An agent responding to such a message may respond with a second messaging having one or more parameters indicating the message is a response and a natural language answer to the question. Alternatively, in some cases, the responding agent may respond with an indication that it cannot answer, that it needs more information, that the task is to be delegated, etc. In some implementations, the message between agents may be formatted, for example, as a JavaScript Object Notation (JSON) document.

An agent may communicate with other resources (e.g., non-agent services) using messages formatted according to the particular resource. An agent may be instructed how to format such a message using a prompt. For example, the prompt may indicate an available resource, the capabilities of that resource, and a schema and/or protocol for communicating with the resource. The prompt may be fed into the LM of the agent along with an input for which the resource may be relevant. Such a prompt may include information about additional resources, including potentially cooperating agents, as well as details regarding when and how to communicate with them. The prompt may also include a description of the agent's role. For example, the prompt may state that the agent is a mediator and how to perform such a role. Alternatively, the prompt may state that the agent is a delegate. The prompt may vary (e.g., be modified by a prompt generation component) depending on the input. For example, when the agent receives an input from a user, the prompt generation component may generate a prompt from the user input and instructions for performing the role of a mediator. For an input received from another agent, the prompt generation component may generate a prompt from the user input and instructions for performing the role of a delegate.

As mentioned above, a prompt may include information regarding available resources. For example, the prompt may include a list of the other agents, models, and/or tools that the agent may leverage to perform a task or subtask. In some cases, the prompt may include a description of each resource's capabilities. In other cases, the prompt may describe how the agent may communicate with a resource to obtain a description of that resource's capabilities. For example, a mediator may message a delegate with the question, "What are your capabilities?" The delegate may respond with a natural language description of its capabilities. For example, an agent with a particular domain specialty may respond, "I am an expert system in the domain of the physical sciences. I can respond to questions in this domain with facts and figures based on the knowledge I have been imbued with; however, I am not configured to perform mathematical calculations."

Returning to FIG. 1A, Agent 1, acting as mediator in this example, may perform the following operations. The operations may include receiving (122) input data representing a first task to be performed by Agent 1. The input data may represent, for example, a user input either spoken, typed, or otherwise input to the user device 110. Continuing with the Robot/Alexa example discussed above, the user 5 may say to the user device 110, "Robot, move to the living room and turn off the lights." The system may detect the word "Robot," which may be a wakeword corresponding to Agent 1. Agent 1 may therefore begin processing the utterance.

In some cases, a particular agent may be invoked based on its wakeword. In some cases, however, a particular agent may be invoked based on device affinity; for example, based on the particular device that received the user command. In other cases, a particular agent may be invoked based on the settings and/or configuration of the system 100, where requests from a certain user or requesting system are routed to a particular agent in the first instance. The invoked agent may perform first-pass processing of the request to determine whether it should handle the request itself or whether one or more tasks/subtasks should be delegated to another agent.

The operations may include generating (124) using a first LM corresponding to Agent 1, first LM output data. To use the first LM to process the user input, the system 100 may prompt the first LM with instructions regarding its role as a mediator in this scenario as well as resources available to it. The prompt may be composed in natural language and/or text in a manner similar to how humans would communicate. For example, the prompt may include:

Hello, you are an Agent named Robot, and you are an Agent Mediator. Welcome to your Agent Operations Guide. As a Mediator, you are one of several Agents in a network. In our network, collaboration is key. You are not working in isolation but as part of a dynamic team of agents, each with unique strengths and expertise. As an Agent Mediator, your role is to facilitate conversations within our network, and act as the link between Users and other Agents.

You will be interacting with both Users and Agents. You will receive messages from users in the following format:

```
{
    "type": "USER_QUESTION",
    "question": "<Question from the User>"
}   #EOI
```

When responding to a question, please follow the following guidelines to determine the appropriate course of action. This uniform format allows for consistent processing and understanding across our system. Your response should always be thoughtful and consider the best approach before deciding.

1. Direct Answer

If you have the knowledge to answer the question directly:

```
{
    "type": "DIRECT_ANSWER",
    "thought": "<Explain your reasoning>",
    "answer": "<Your answer>",
    "actor": "<Your name>"
}   #EOI
```

2. Delegation

If you believe another Agents could offer a better perspective:

```
{
    "type": "DELEGATION_REQUEST",
    "thought": "<Explain why you're delegating>",
    "delegate": "",
    "request": "<Question for the delegated Agent>"
}   #EOI
```

Your response must adhere to the specified format for the scenario you choose, and must always be terminated by #EOI.

The prompt may include further instructions for chain-of-thought and/or ReAct processing. Such instructions may explain to the LM how to break a task into a sequence of subtasks:

For complex queries that involve multiple steps or require information synthesis, a structured approach ensures accuracy and thoroughness in responses. Here's how to handle such queries:

1. Dissect the Query: Break down the overall question into its component parts.
2. Resolve Preliminary Information: Address any preliminary steps that can be handled directly.
3. Delegate Specific Inquiries: If specific information is outside your immediate knowledge or capabilities, delegate those inquiries individually.
4. Synthesize Information: Once you have the required information, synthesize it to answer the original question comprehensively.
5. Communicate the Comprehensive Answer: Provide a response that addresses all aspects of the original query, ensuring it is clear, accurate, and directly answers the question posed.
6. Parallelize when you can: if you think multiple delegations can occur in parallel, let me know by giving me all the delegation directives in one go.

Agent 1 may feed this prompt along with the input data into the first LM. Agent 1 may determine that the task includes two subtasks: moving to the living room and turning off the light. Agent 1 may determine that it controls the user device 110 and can navigate it to the living room. Agent 1 may determine that it is not capable of turning off the lights; however, it may determine that Agent 2 (e.g., corresponding to Alexa) is capable of operating the lights. Agent 1 may therefor determine to delegate this subtask to Alexa, which may have access to smart home resources. Agent 1 may thus generate the first LM output data, which may include a message formatted according to the delegation request specified in the prompt.

The operations may include sending (126) the message to Agent 2. The message may indicate a delegation request per the schema specified in the prompt. The message may name the delegate agent (e.g., Agent 2). And the message may include a natural language request for Agent 2. For example, the delegation request may be "Please turn off the light."

To handle the subtask delegated to it, Agent 2 may need more information. In this case, Agent 2 may need the identity of the light. In some cases, Agent 2 may respond to the delegation request with a question. Agent 2 may be prompted in a manner similar to Agent 1 as will be described in more detail below with reference to FIG. 1B. The question from Agent 2 may be formatted as follows:

```
{
    "type": "AGENT_QUESTION",
    "actor": "<Name of the other Agent>",
    "question": "<Question from the Agent>"
}   #EOI
```

The operations may include receiving (128) second LM output data from Agent 2. Agent 1 may receive the information and create a prompt for the first LM that includes the relevant context to answer the question. For example, Agent 1 may create a prompt that includes the relevant mediator role instructions, the original input data, and the delegation request. The operations may include generating (130) third LM output data by processing this prompt using the first LM. The third LM output data may correspond to the task and indicate that the answer to the question is the living room light. Agent 1 may send another message to Agent 2 naming the living room light. Agent 2 may turn off the light, and send another response to Agent 1 indicating completion of the subtask. The operations may include sending (132) the third LM output data to another system component. This may include causing the user device 110 to present an output indicating that the task has been completed. Additionally or alternatively, it may include sending the data to another endpoint of the system 100 to cause another system component or device to perform an action. Such actions may include actuating a smart-home or smart-vehicle device, controlling a media playback device, interacting with a website or app, sending a message to another user, etc.

In some cases, accomplishing the task may take into account the passage of time. For example, Agent 1 cannot relocate the user device 110 to the living room instantaneously. In some implementations, the cooperation may involve determining an action to be performed upon detection of a future condition. In this example, Agent 1 may determine that the action is to delegate to Agent 2 the turning off of the light, and the condition is the arrival of the user device in the living room. Agent 1 may store data representing the action such that that the action can be executed upon detection of the triggering event (e.g., arriving in the living room).

Such future conditional actions may be delegated to a resource such as a routines tool. A routines tool may be a software component or system, possibly non-LM-based, that can proactively detect conditions and/or the occurrence of predefined events. Upon detecting the condition or occurrence, the routines tool may execute a stored action. The routines tool may perform a one-time routine (e.g., perform the action once upon the first detection of the condition or occurrence and then discard the routine) or a repeated routine (e.g., performing the action for each detection of the condition or occurrence). Repeated routines may be performed indefinitely and without limit until deactivated, during a predefined time window such as a month or year, for a specified number of times, etc. In this example, Agent 1 may delegate a one-time routine to a routines tool. Thus, when the routines tool detects that the user device 110 has entered the living room, it may execute the action to call Agent 2 to turn of the light, and discard the routine.

In various implementations, the mediator agent may perform more, fewer, and/or different operations. The agent may perform certain operations in a different order and/or in parallel unless otherwise specified.

Figure 1B:
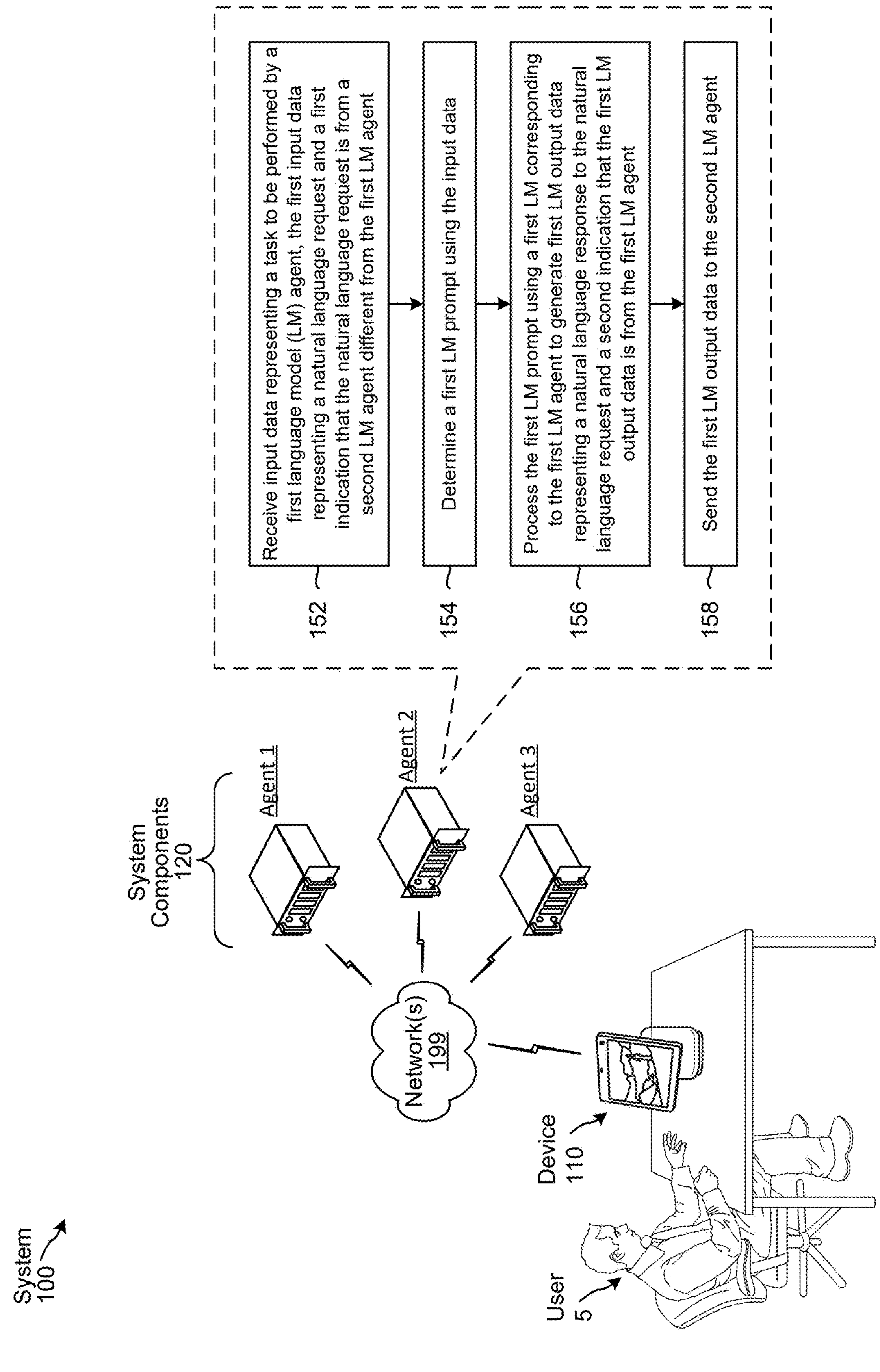
FIG. 1B is a conceptual diagram illustrating operations of a delegate LM agent in the multi-agent system, according to embodiments of the present disclosure.

FIG. 1B is a conceptual diagram illustrating operations of a delegate LM agent in the multi-agent system 100, according to embodiments of the present disclosure. As the mediator, Agent 1 may have received a description of Agent 2 and its capabilities. Agent 1 may therefore delegate appropriate subtasks to Agent 2. For example, the operations may include receiving (152) some input data. The input data may represent a task (e.g., a subtask) delegated to Agent 2 by Agent 1. The input data may include a natural language request (e.g., a description of the task) and a first indication that the natural language request is from Agent 2. The operations may include determining (154) a first LM prompt using the input data. To use an LM to process the user input, the system 100 may prompt the LM with instructions regarding its role as a delegate in this scenario as well as resources available to it. Similar to the mediator prompt described above, the delegate prompt may be composed in natural language and/or text:

Hello, you are an Agent named Alexa, and I am your Agent Mediator. Welcome to your Agent Operations Guide. As your Mediator, I am here to support you through the collaborative processes and interactions that are key to our shared success within our system. You are one of several Agents in a network. In our network, collaboration is key. You are not working in isolation but as part of a dynamic team of agents, each with unique strengths and expertise. As your Agent Mediator, my role is to facilitate conversations within our network, acting as the link between you, other Agents, and Users.

You will be interacting with both Users and Agents. You will receive messages from users in the following format:

```
{
    "type": "USER_QUESTION",
    "question": "<Question from the User>"
}   #EOI
```

When responding to a question, please follow the following guidelines to determine the appropriate course of action. This uniform format allows for consistent processing and understanding across our system. Your response should always be thoughtful and consider the best approach before deciding.

1. Direct Answer

If you have the knowledge to answer the question directly:

```
{
    "type": "DIRECT_ANSWER",
    "thought": "<Explain your reasoning>",
    "answer": "<Your answer>",
    "actor": "<Your name>"
}   #EOI
```

2. Delegation

If you believe another Agents could offer a better perspective:

```
{
        "type": "DELEGATION_REQUEST",
        "thought": "<Explain why you're delegating>",
        "delegate": "",
        "request": "<Question for the delegated Agent>"
}       #EOI
```

The prompt may include further instructions for chain-of-thought and/or ReAct processing similar to the mediator prompt described above.

The operations may include processing (156) the first LM prompt using a first LM corresponding to Agent 2. The first LM may generate first LM output data that represents a natural language response to the request. The first LM output data may further include an indication is that the response is from Agent 2. The operations may include sending (158) the first LM output data (e.g., the response) back to Agent 1.

Continuing the Robot/Alexa example from above, first LM output data may include other indications such as a determination to turn off the light in the living room. In some cases, Agent 1 may provide Agent 2 with all the information it needs to actuate the correct light switch. Thus, the first LM output data may represent a confirmation that the task has been performed. This may correspond to the "DIRECT_ANSWER" format described in the prompt.

In some cases, however, Agent 2 may not be able to determine which light to turn off based on the input data from Agent 1. In that case, the first LM output data may represent a request to Agent 1 to disambiguate or otherwise complete the task description. This may correspond to the "DELEGATION_REQUEST" format described in the prompt. The prompt may include further instructions for how delegation should occur:

When you decide to delegate, I will mediate that delegation, and give you responses from the other Agents in the following form:

1. * Delegation Response*—Reply from another agent, to be considered in your response When I get a reply from another agent, I will relay it to you as follows:

```
{
    "type": "DELEGATION_RESPONSE",
    "reply": "<Reply from the delegated Agent>",
    "actor": "<Name of delegated Agent>"
}
```

In addition prompt may instruct Agent 2 to how to handle responses, including evaluation the responses and telling the Agent 1 the result of its evaluation:

Evaluating Responses: Upon receiving a reply from a delegated agent, assess whether the response accurately and adequately answers the original question. For instance, if a question pertains to a distance, a response providing a generic time or unrelated information is not satisfactory.

If you think the reply is satisfactory reply, respond to me with the follow message:

```
{
  "type": "ACCEPTED_RESPONSE",
  "thought": "<Explain why you think the answer is satisfactory>",
  "reply": "<Reply from the delegated Agent>"
}
```

If you think the reply is unsatisfactory, respond to me with the follow message:

```
{
  "type": "REJECTED_RESPONSE",
  "thought": "<Explain why you think the answer is unsatisfactory>",
  "reply": "<Reply from the delegated Agent>"
}
```

If Agent 2 determines that the response from Agent 1 is adequate (e.g., it allows Agent 2 to identify the light switch to actuate), Agent 2 may return an "ACCEPTED_RESPONSE" message to Agent 1.

As discussed above, in some cases, the cooperative operations of the respective agents may account for the passage of time between performance of different subtasks of the overall task. In some cases, the Agent 1 may delegate the subtask to Agent 2 with an instruction that Agent 2 is not to execute the action unless and/or until it receives a subsequent command. Agent 2 may process the message representing the subtask and instruction, and generate second LM output data. The second LM output data may describe the action to be performed in response to receiving the future command. Agent 2 may assign a unique identifier to the action, and return the identifier to Agent 1. Agent 1, upon detecting a condition or occurrence of an event that is to trigger the action, may send the command and the identifier back to Agent 2. In response to receiving the command and identifier, Agent 2 may perform the action; for example, by retrieving a previously generated and stored description of the action, or by processing the command and second LM output data using the first LM.

In various implementations, the mediator agent may perform more, fewer, and/or different operations. The agent may perform certain operations in a different order and/or in parallel unless otherwise specified.

Figure 2A:
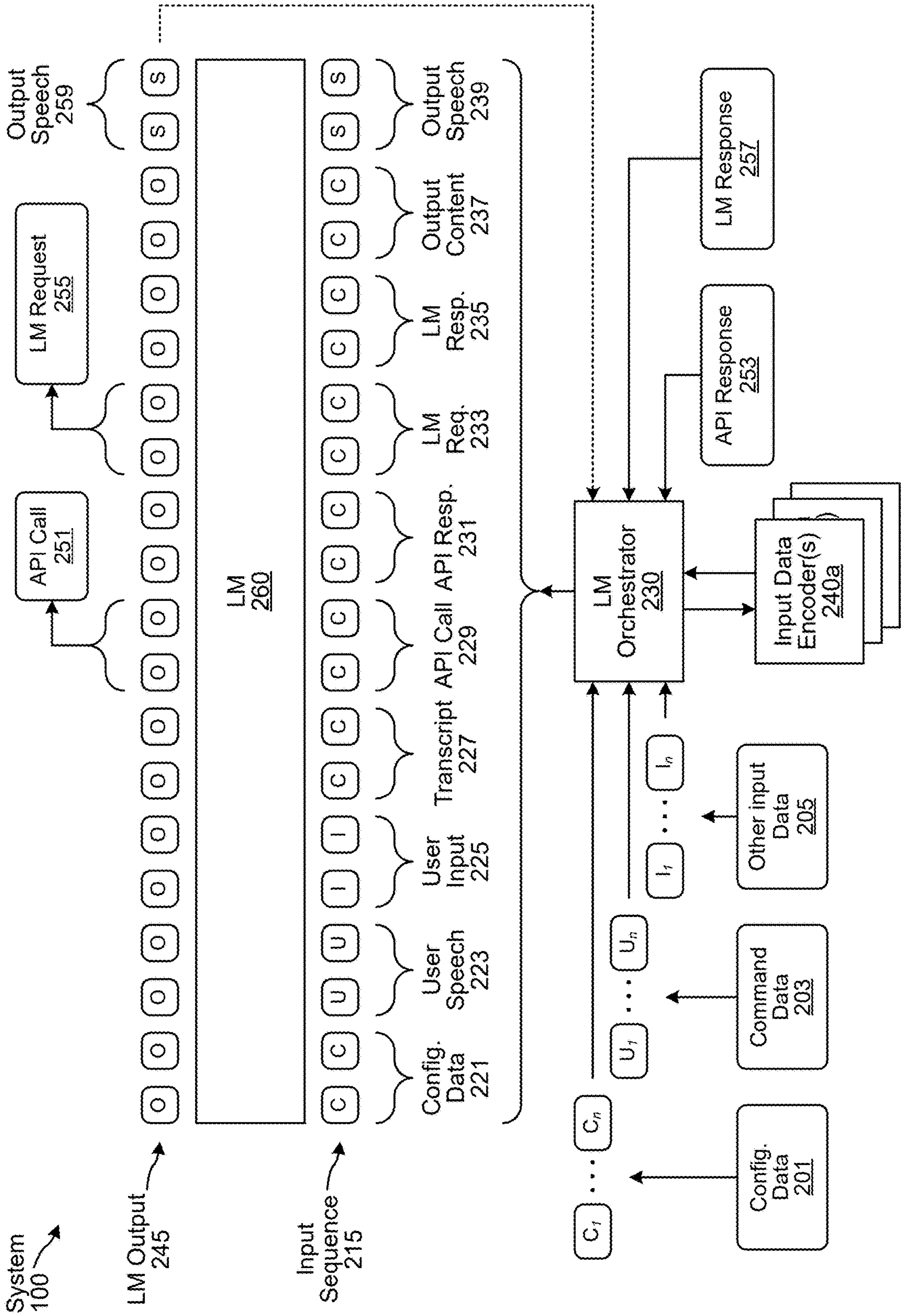
FIG. 2A is a conceptual diagram illustrating example operations of the LM and LM orchestrator of the system, according to embodiments of the present disclosure.

FIG. 2A is a conceptual diagram illustrating example operations of the LM 260 and LM orchestrator 230 of the system 100, according to embodiments of the present disclosure. The system 100 may also include one or more input data encoders 240*a*, 240*b*, 240*c*, etc. (collectively "input data encoders 240"). Each input data encoder 240 may be configured to encode or "tokenize" a data of a particular modality into tokens to be processed by the LM 260.

The LM 260 may be a computer model such as a deep neural network. The LM 260 may be described by a set of parameters (e.g., weights determined during training) and hyperparameters (e.g., configured by one or more developers). The hyperparameters may describe an architecture of the model, a number of layers, a number of nodes in a layer, connections between nodes, activation functions of nodes, etc. The hyperparameters may include additional information about the architecture including skip connections, recurrent connections, normalization layers, pooling operations, softmax operations, etc. The model may include one or more components. The components may include, for example, smaller models within the larger acoustic model such as convolutional neural networks (CNNs), recurrent neural networks (RNNs), transformers, etc. The parameters may be determined via training using one or more training datasets.

In some implementations, the LM 260 may be a decoder-only transformer architecture. The LM 260 may be a multi-modal LM. A multi-modal LM is a model that can process data of different types; for example, audio data, video data, sensor data, content data, etc. An example of a multi-modal LM is a speech-to-speech multi-modal LM. A speech-to-speech LM may process audio data and/or content data (e.g., representing a transcript of speech) and generate audio data and/or content data. In various implementations, a speech-to-speech LM may be used to perform speech recognition (e.g., receiving speech audio and generating a text transcription), natural language understanding (e.g., semantic interpretation of the content), natural language command processing and/or output generation, speech synthesis (e.g., receiving a text transcription and generated speech audio), machine translation (e.g., receiving speech audio and/or text in a first language and generating speech audio and/or text in a second language), voice conversion (e.g., receiving speech audio having first voice characteristics and generating speech audio having different voice characteristics), etc. In other implementations, the LM 260 may additionally or alternatively process and generate other modes of data such image/video data, sensor data, API calls/responses, continuous or discrete control signals for actuating physical devices (e.g., servos, motors, lights, etc.), and the like. Multi-modal operation of the LM 260 is described in further detail below with reference to FIG. 6.

The LM 260 may be based on an LM pretrained on content (e.g., text) only. The "vocabulary" of the LM may be expanded to account for tokens of other modalities including those discussed above. Token data corresponding to other modalities that are introduced to the LM may be viewed as tokens from a new language; for example, speech-to-text (e.g., speech recognition) and text-to-speech (e.g., speech synthesis) tasks become analogous to translation, such as between two different natural languages (e.g., English and French).

The input data encoders 240 can convert input data of different modalities into input tokens for processing by the LM 260. A first input data encoder 240*a* may be an acoustic model 240*a*. The acoustic model 240*a* may be a computer model such as a deep neural network. The acoustic model 240*a* may be described by a set of parameters (e.g., weights determined during training) and hyperparameters (e.g., configured by one or more developers). The hyperparameters may describe an architecture of the model, a number of layers, a number of nodes in a layer, connections between nodes, activation functions of nodes, etc. The hyperparameters may include additional information about the architecture including skip connections, recurrent connections, normalization layers, pooling operations, softmax operations, etc. The model may include one or more components. The components may include, for example, smaller models within the larger acoustic model such as convolutional neural networks (CNNs), recurrent neural networks (RNNs), transformers, etc. The parameters may be determined via training using one or more training datasets. In some implementations, the acoustic model 240*a* may be trained in a self-supervised model using 5-10 million hours or more of raw, multilingual speech data. In some implementations, the acoustic model 240*a* may be configured similarly to a Hidden-Unit Bidirectional Encoder Representations from Transformers (HuBERT) model. In some implementations, the acoustic model 240*a* may be a 1-2 billion parameter model configured to receive audio data (e.g., spectrogram data) having a frame size of 20-40 ms. A frame of audio data may refer to a segment of audio data representing 10, 20, 30, 40 ms, etc. of audio. The frame of audio data may be in the form of, for example, a spectrogram representing the energy content of that portion of audio at various frequency bands. In some implementations, the spectrogram may be, for example, a Mel-spectrogram. Spectrogram data may be generated from waveform audio data using a component such as an acoustic front end (AFE). Thus, a microphone (such as the microphone 720) may receive audio and generate an analog electrical signal, an analog-to-digital converter may convert the analog electrical signal into waveform audio data, and the AFE may convert the waveform audio data into spectrogram data. In some implementations, the analog-to-digital converter may be a component of the AFE. In some implementations, the AFE may perform other processing on the audio data including echo cancelation, noise reductions, beamforming from multiple microphones, etc. As used herein, unless otherwise specified, "audio data" may refer to waveform audio data, spectrogram audio data, and/or tokenized audio data such as acoustic tokens or higher-fidelity audio tokens.

The acoustic model 240*a* may receive audio data in spectrogram form. The audio data may include command data 203 spoken by a user. In some cases, the other input data 205 may include additional audio data to be processed by the acoustic model 240*a*. The acoustic model 240*a* may encode the audio data into acoustic tokens into a tokenized acoustic representation. In some implementations, the acoustic model 240*a* may be trained to encode the audio data into acoustic token data in a manner that emphasizes characteristics of the audio data that relate to content (e.g., by jointly training the acoustic model 240*a* with a content encoder 240*b* configured to tokenize a text input into a semantic space). The acoustic token data may therefore represent points in an acoustic space, a semantic space, or a joint acoustic-semantic space. In some implementations, the acoustic model 240*a* may be trained end-to-end with the LM 260 such that the acoustic model 240*a* and LM 260 learn a shared token space. In some implementations, the content token space may represent a vocabulary shared by the acoustic model 240*a* and LM 260.

In some implementations, the acoustic model 240*a* may include a quantizer. The quantizer may process encoded audio data and generate speech tokens. The encoded audio data may be continuous or discrete data that represents speech in the command data 203 and/or other input data 205. The quantizer may the quantize the continuous or discrete data into a finite set of discrete, representative vectors (e.g., centroids). The representative vectors may make up the speech tokens. Quantizing the speech representations into speech tokens in this manner may reduce the computing resources required by the LM 260 and/or other models of the system 100 when processing speech. In some implementations, the quantizer may be configured and/or trained in a manner similar to a vector quantized variational autoencoder (VQ-VAE). In various implementations, a speech token may correspond to a portion of audio; for example, 1, 2, 4, 8, 16 frames of audio data, etc. (e.g., where each frame of audio data corresponds to approximately 40 ms of audio; however, a spectrogram may represent a frame of audio having a longer or shorter duration). In various implementations, a speech token may be an integer having a value between zero and 2,047, 4,095, 16,383, 32,767, etc. Hyperparameters such as these may be selected to achieve a desired balance between speed, computing resources, and accuracy of the reconstruction. The speech token data learned through these training operations may represent the vocabulary of content and pronunciation that the LM 260 may model.

A second input data encoder 240*b* may include a content encoder 240*b* such as a text tokenizer. The content encoder 240*b* may include software and/or hardware configured to convert input text data into text tokens for processing by the LM 260. In some implementations, the content encoder 240*b* may generate text token data representing the content and/or pronunciation of the input text data (e.g., words and/or phonemes, etc.). The content encoder 240*b* may include a machine learning component such as a neural network encoder and/or a quantizer. In some implementations, the content encoder 240*b* may be trained in concert with the LM 260 to generate content tokens and/or acoustic tokens. In an example implementation, the content encoder 240*b* may tokenize the input text data for example using byte-level, byte-pair encoding (BBPE) of 2051 tokens. This number may allow the content encoder 240*b* and/or LM 260 to be flexible for unseen characters and/or character combinations. The input text data may be encoded using an embedding layer to generate an embedding with a dimension D=1024. This embedding may be summed with a learnable positional embedding. A mask token may be used to mask parts of the input text data for training (e.g., to cause the LM 260 to predict and/or replace this portion of the input text data).

A third input data encoder 240*c* may include a reference encoder 240*c*. The reference encoder 240*c* may generate a reference embedding used by the LM 260 to, for example, correlate target audio with a particular speaker's voice characteristics (e.g., for voice recognition. A reference embedding (e.g., as stored in the voice data storage component 595) may also be used by the LM 260 and/or rendering model 380 to generate output speech having certain voice characteristics. The reference encoder 240*c* may be a machine learning component such as a neural network. The reference encoder 240*c* may be configured to encode audio data (e.g., voice samples) into reference embedding data in a latent space that represents a range of various voice characteristics corresponding to different users (e.g., timbre, accent, etc.) In some implementations, the reference encoder 240*c* may be trained using, for example, contrastive learning such that the reference encoder 240*c* generates reference embeddings that are close (e.g., as measured using cosine similarity) for voice samples corresponding to a same speaker, but that are distant for voice samples corresponding different speakers. In some implementations,), the reference encoder 240*c* (or a different input data encoder) may be configured to operate analogously to correlate an image with a particular user's facial characteristics (e.g., for face recognition), etc.

In some implementations, the reference encoder 240*c* may be a transformer neural network such as a vision transformer (ViT). A vision transformer may receive a sequence of vectors generated from fixed-size patches of an image and predict a classification. A position embedding may be added to the vectors, and a classification token may be added to the sequence to cause the reference encoder 240*c* to output a classification of the input data. Rather than processing images, however, the reference encoder 240*c* may process spectrogram data (e.g., Mel-spectrograms) representing frequency content of an audio waveform over time. In some implementations, the reference encoder 240*c* may be a component of the LM 260 or LM orchestrator 230; in other implementations, it may be a separate component.

The LM orchestrator 230 may be configured to receive the various input data, encode the input data using the appropriate input data encoder 240, and generate LM prompts for the LM 260. The LM prompt may be represented by the input sequence 215. Thus, the LM orchestrator 230 may act as (or include) a prompt generation component. The input sequence 215 will grow as the system 100 generates data by performing various subtasks of a complex task; e.g., using the LM 260 to perform inferences as well as delegating subtasks to other agents and other resources. The LM orchestrator 230 may begin an input sequence 215 with tokens representing instructions for how the LM 260 should operate, as represented by the configuration data 201. The configuration data 201 may include instructions for how to handle the command data 203, as well as information for use in performing those instructions. In some cases, the instructions may include a framework for chain-of-thought and/or ReAct processing as described previously. In some cases, the instructions may relate to delegation (e.g., either to or by the agent associated with the LM 260). In some cases, the information may relate to the identity and capabilities of other resources, as well as message formats to use when communicating with the other resources.

Thus, the LM orchestrator 230 may generate the input sequence 215 using the tokenized configuration data 221, the tokenized user speech 223 (e.g., representing the command data 203), and user input data 225 (e.g., representing any other input data 205 provided for handling the command data 203). The LM orchestrator 230 may cause the LM 260 to process the input sequence 215 to generate LM output data 245. The LM output data 245 may represent tokens predicted, inferred, and/or generated by the LM 260 processing of the input sequence 215. The LM 260 may generate LM output data 245 in stages as the LM orchestrator 230 operates the LM 260 through various subtasks of a complex task. The LM 260 may operate autoregressively such that it predicts a next token of the LM output data 245 based on the input sequence 215 and previously predicted tokens of the LM output data 245. As a first subtask, the LM orchestrator 230 may cause the LM 260 to generate a transcript 227 of the tokenized user speech 223. The LM 260 may process the transcript 227 and parse the task being asked of it by the user (e.g., as represented by the command data 203). Speech-to-text (e.g., ASR) operations of the multi-modal LM system 100 are described in further detail below with reference to FIG. 5D.

In the example shown in FIG. 2A, the LM 260 may determine a first subtask to delegate to a resource corresponding to a particular API. The LM 260 may generate an API call 251 (e.g., using a format specified by the configuration data 201). The system 100 may send the API call 251 to the API endpoint. The resource may generate an API response 253, which the system 100 may send back to the agent. The LM orchestrator 230 may add the API call 229 and the API response 231 to the input sequence 215 for further processing by the LM 260.

The LM 260 may determine a second subtask to delegate another agent. The LM 260 may generate an LM request 255 (e.g., using a format specified by the configuration data 201). The system 100 may send the LM request 255 to the other agent. The other agent may process the LM request 255 and return an LM response 257. The LM response 257 may also conform to a format specified by the configuration data 201; thus, the LM 260 may readily process the LM response 257 even if it includes unstructured elements such as a natural language answer (and/or request for additional information). The LM orchestrator 230 may add the LM request 233 and the LM response 235 to the input sequence 215 for further processing by the LM 260.

The LM 260 may process the input sequence 215 including the API and LM responses and determine that it has the information it needs to generate a response to the command data 203. The LM 260 may therefore generate output content data 237, which may represent text of a responsive message to output to the user. The LM 260 may process the output content data 237 to generate output speech 259. The LM 260 may generate the output speech 259 autoregressively by processing previously predicted output speech tokens 239. When the LM 260 predicts and end-of-speech, the LM orchestrator 230 may route the output speech 259 to, for example, a rendering model 380 and/or vocoder 580 for conversion to audio data that may be output to the user (e.g., via a loudspeaker 712 of the user device 110). Text-to-speech and speech-to-speech operations of the multi-modal LM system 100 are described in further detail below with reference to FIGS. 5C and 5D, respectively.

Figure 2B:
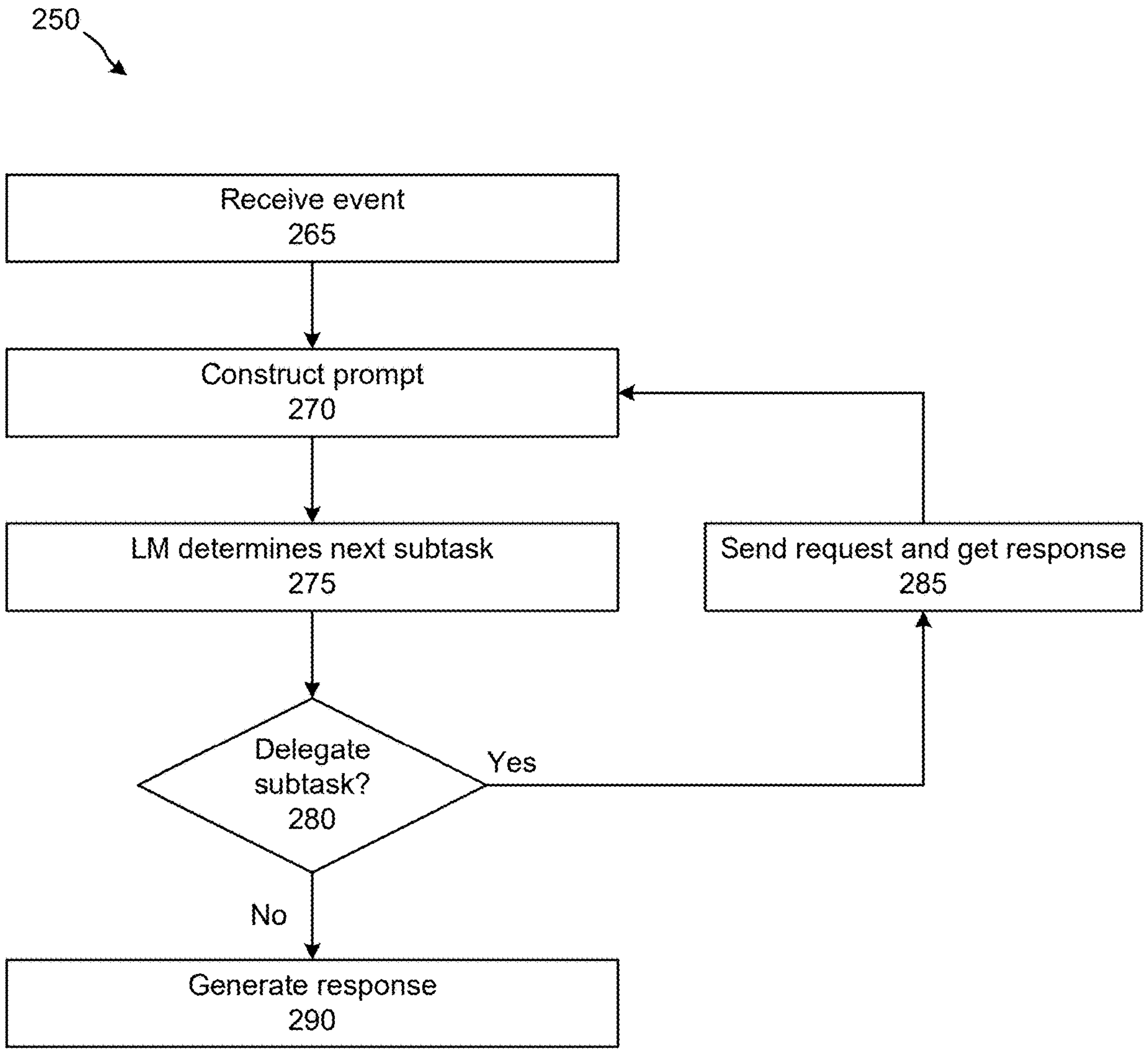
FIG. 2B is a flowchart illustrating example operations of the LM and LM orchestrator of the system, according to embodiments of the present disclosure.

FIG. 2B is a flowchart illustrating example operations 250 of the LM 260 and LM orchestrator 230 of the system 100, according to embodiments of the present disclosure. The example operations described above with reference to FIG. 2A may, in some cases, continue and/or repeat for subsequent turns of communication between the user 5 and the system 100. At each turn, the LM orchestrator 230 may add a new segment of data to the input sequence 215. In addition to allowing the system 100 to decompose complex tasks, such chain-of-thought style inference may facilitate the use of security and/or privacy mechanisms. For example, the system 100 may include a mechanism for checking data sent or received by an agent to determine whether it conforms to runtime requirements related to content moderation, Responsible AI, and/or multi-step orchestration, etc. Additionally or alternatively, the LM 260 may evaluate a received response and/or reflect on its own output. If the LM 260 determines the response is lacking, it may ask the resource for further information. If the LM 260 determines that its previous output is lacking, the system 100 may take various remedial steps such as reconstructing the prompt, obtaining additional information, and/or delegating a subtask to a resource that may be more capable of generating a better answer.

The operations 250 may include receiving (265) an event. The event may variously include a user utterance, a request from a mediator or other agent, a triggering event (e.g., corresponding to a routine), a command to execute a routine, etc. The operations 250 may include constructing (270) a prompt (e.g., the input sequence 215). The LM orchestrator 230 may act as a prompt generation component using a task generation component 435 and/or an LM shortlister component 440 as described in further detail below with reference to FIG. 4. The LM orchestrator 230 may compile information relevant to handling the event including mediation/delegation instructions, available resources, message formats, etc., as well as the input data itself (e.g., command data 203 and/or other input data 205).

In some implementations, the LM orchestrator 230 may construct the input sequence 215 based on exemplars. An exemplar may be a prompt template that relates to the input data. A prompt template may be hardcoded with dynamic elements. For example, the prompt template may include instructions corresponding to a chain-of-though processing framework that may not vary based on the input. The prompt template may include a portion where the LM orchestrator 230 may add input-specific information such as available resources. For example, in the mathematical calculation example described previously, the LM orchestrator 230 may retrieve an exemplar corresponding to a user question and, in response to the presence of numbers in the command data, add a description of the Calculator tool. In the living room light example, the LM orchestrator 230 may include a description of Alexa in response to the reference to smart-home functionality in the question.

In some implementations, LM orchestrator 230 may retrieve exemplars using a vector database. The LM orchestrator 230 may convert the event and/or input data into an embedding. The embedding may represent features extracted from the input data using, for example, a neural network encoder. The extracted features may relate to the nature of the event or request such that the embedding can be used to retrieve from the vector database exemplars corresponding to similar inputs. The conversion/encoding of the input data need not involve language processing as such (e.g., ASR and/or NLU). Rather, the conversion/encoding may be a relatively lightweight process capable of generating a representation of the input data that can give the LM orchestrator 230 a "ballpark" idea of the relative nature of the input or event. The LM orchestrator 230 may use the embedding to identify a nearest or n-nearest reference embeddings in the vector database. The LM orchestrator 230 may retrieve the exemplar(s) corresponding to the nearest reference embedding(s) and use it/them to construct the input sequence. The exemplar may include instructions for agent cooperation and/or describe schemas for communicating with resources, as described previously. The LM orchestrator 230 may generate the portion of the input sequence 215 corresponding to the configuration data 201 (e.g., as specified in the exemplars) in the form of text and/or text token data. The LM orchestrator 230 may construct the input sequence 215 to additionally include the command data 203 (e.g., which may be in the form of speech tokens if the command was spoken to the system 100) and any other input data 205. The LM orchestrator 230 may leverage one or more of the input data encoders 240 to tokenize various portions of the data for input to the LM 260.

The operations may include determining (275) the next subtask. The LM 260 may process the input sequence 215 according to a chain-of-thought framework to decompose the overall task into a sequence of subtasks. Although some subtasks may be performed in sequence (e.g., where a subsequent subtask is performed using a result of a previous subtask), the LM 260 may be instructed to perform and/or delegate subtasks where possible to reduce latency and improve the user experience. When the LM 260 determines the next subtask, the LM orchestrator 230 may determine (280) that the LM output data 245 indicates a task to be delegated (e.g., based on the portion of the LM output data 245 corresponding to one of the specified message formats). In some cases, an agent may determine whether to delegate a task based on the capabilities of other agents as described in its instructions. In some cases, the agent may send a message to another agent requesting a description of its capabilities. The agent may send the request to one or more other available agents as well. In some cases, the agent's own capabilities may overlap with those of another agent. In such cases, the agent both delegate the subtask and perform the subtask itself, and compare and/or combine the two results when generating the ultimate response.

If the LM orchestrator 230 determines that the subtask is to be delegated ("yes" at 280), the operations 250 may include sending (285) the message to the resource and observing a response. This may involve sending a message to another agent, calling an API, and/or accessing another tool or resource. Examples of various resources that the agent may access are described in further detail below with reference to FIG. 5A.

The LM 260 may delegate a task by sending the input data to a resource capable of handling it. In some cases, the LM 260 may modify or augment the data when sending it to another agent. For example, the LM 260 may generate a message that includes the original command data 203 and enhance or decorate it with context useful for handing the task. The enhancement may include information related to interaction history, context, and/or a relevant entity. In the Robot/Alexa example described above, Robot may decorate the command "turn off the light" with context information identifying the particular light that Alexa is to turn off. In some cases, the LM 260 may rewrite or reconstruct the command to, for example, remove information irrelevant to the delegated subtask and clarify the information that is relevant.

In another example, the enhancement may include information about in-progress activities. For example, if the user asks Alexa to play music and later says, "Stop" in the presence of Robot, Robot may consider the current context to understand what the user's command pertains to. If the robot is currently stationary and otherwise not currently performing an action, it may infer that the command pertains to some other action. Robot may determine that Alexa is currently performing an action (e.g., playing music); thus, Robot may delegate the command to Alexa. Robot may generate a message to Alexa that enhances the "Stop" command with relevant information, which may include the user who uttered the command, context data indicating that Robot (e.g., via a microphone 720 of the motile device 110*k* or other user device 110) hears music playing, etc. Alexa may use the enhanced information in the message to determine that the delegated command pertains to halting the music.

The exchange of request and response for a delegated subtask may give the system 100 an opportunity to impose rule-based controls on the data exchanged within the system 100 (e.g., between agents and resources) and/or with external systems. For example, the agent and/or the system 100 may have a library of policies that define what types of data may and may not be shared across and/or outside of the system 100. Such prohibitions may variously pertain to vulgar, obscene, and/or illegal content; personally identifying information; financial information such as bank account or credit card numbers; confidential healthcare information; actions prohibited by the system; child safety restrictions; etc.

Using the received response, the operations 250 may return to the stage (270) in which the LM orchestrator 230 may construct a new prompt based on the response to the delegation request. In constructing the new prompt, the LM orchestrator 230 may include the previous history of the interaction and/or any context relevant to continue performing subtasks related to the overall task. In some cases, the LM orchestrator 230 may shorten the prompt to remove information no longer relevant to completing the task. Including irrelevant information in a prompt may "distract" a LM in that the LM may still give the irrelevant information weight when generating the response. Thus, removing irrelevant information from the input sequence 215 may improve accuracy of the inference. In addition, the shorter input sequence 215 may reduce latency and/or the use of computing resources by the LM 260.

The LM orchestrator 230 may feed the new input sequence 215 into the LM 260. The input sequence 215 may include the original configuration data representing instructions, etc., for how the LM 260 should perform. In some cases, those instructions may include an instruction to evaluate the response. Thus, the LM 260 may, in processing the new input sequence 215, assess whether the response accurately and adequately answers the original question. The LM 260 may determine to accept the response, reject the response, or generate a follow-up reply to elicit more information from the resource. The agent may respond to the resource (or mediating agent) to indicate its acceptance/rejection of the response, or to request additional information. If the agent determines to request more information, the system 100 may handle the request similar to a delegated subtask by repeating the stages 285, 270, and/or 275 as appropriate. In a similar manner, the LM 260 may evaluate its own output in a process referred to as reflection. When the LM 260 generates an output, the LM orchestrator 230 may feed the LM output data 245 back into the LM 260 with an instruction to assess whether the LM output data 245 represents an accurate and adequate response to the task or subtask.

If the LM 260 determines that there are no other subtasks to be delegated ("no" at 280) the operations may proceed to generating (290) a response to the user. The agent may generate the response by generating an answer (e.g., in the form of text or content tokens) and converting the answer to speech (e.g., in the form of speech tokens). The system 100 may render the response as appropriate.

Figure 3:
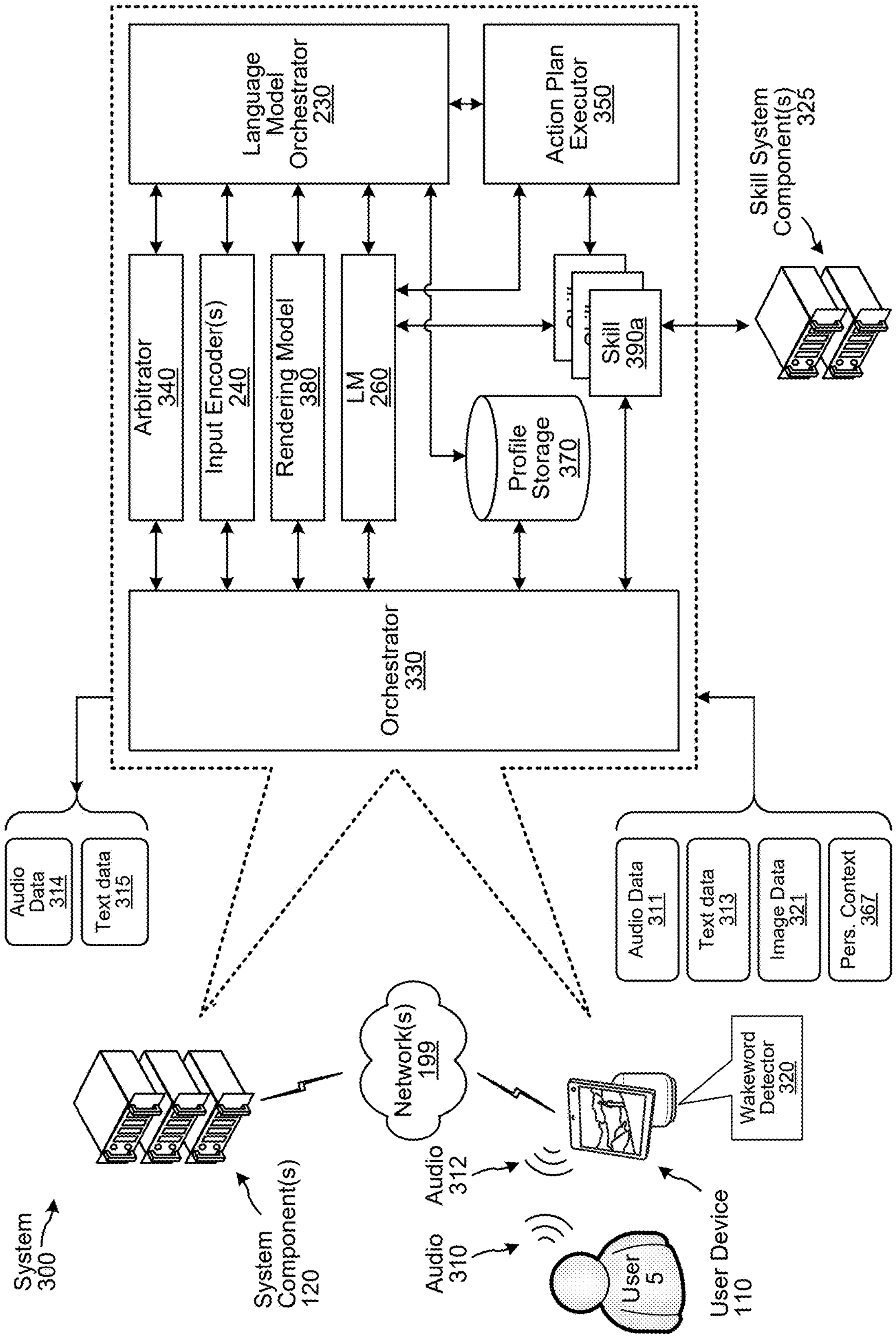
FIG. 3 is a conceptual diagram illustrating components of a natural language processing system, according to embodiments of the present disclosure.
Figure 6:
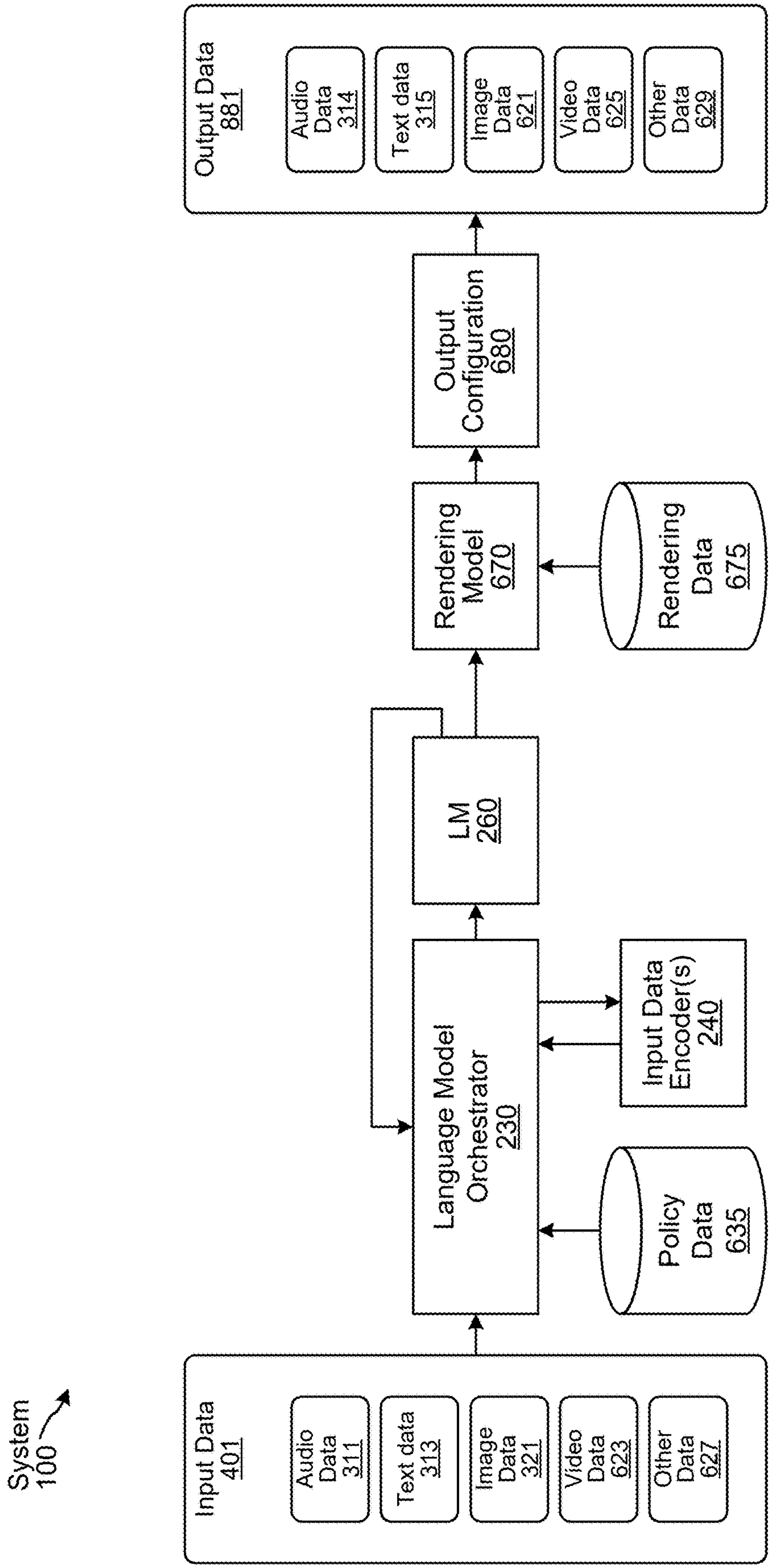
FIG. 6 is a conceptual diagram of a multi-modal LM system, according to embodiments of the present disclosure.

FIG. 3 is a conceptual diagram illustrating components of a natural language processing system 300, according to embodiments of the present disclosure. The natural language processing system 300 may employ various technologies such as the LM 260 and other models described above to perform ASR, NLU, NLG, TTS, and/or language modeling to function as a virtual assistant system. In some implementations, the LM 260 may be a multi-modal LM as illustrated in FIG. 6. A user 5 may interact with the virtual assistant system using, for example, voice commands and/or natural language text inputs. The virtual assistant system may respond to user 5 commands using, for example, synthesized speech, natural language text on a display, and/or performing various actions for and/or on behalf of the user 5. For example, the user 5 may ask the natural language processing system 300, and the natural language processing system 300 may use the various natural language and speech processing technologies to process the question, determine response data (e.g., an answer), and output the response data (e.g., as synthesized speech and/or text). For example, the user device 110 may receive a user input in the form of audio data 311 and/or text data 313. The system 300 may process it to determine a response, which the user device 110 may output in the form of output audio 312 and/or text/images on a display 716. In some implementations, the system 300 may process the user input using an LM natural language processing pipeline to generate responsive output data 481 based on input data 401 as described in further detail below with reference to FIG. 4.

Various components of the natural language processing system 300 are shown in FIG. 3. The various components may be located on same or different physical devices. Communication between various components may occur directly or across a network(s) 199. The user device 110 may include audio capture component(s), such as a microphone 720 or array of microphones of a user device 110, captures audio 310 and creates corresponding audio data 311. Once speech is detected in audio data representing the audio 310, the user device 110 may determine if the speech is directed at the user device 110/system component(s) 120. In at least some embodiments, such determination may be made using a wakeword detection component 320. The wakeword detection component 320 may be configured to detect various wakewords. In at least some examples, each wakeword may correspond to a name of a different digital assistant and/or agent. One example wakeword/agent name is "Alexa." Another example wakeword/agent name is "Robot." In another example, input to the system may be in form of text data 313, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 321 representing those image(s) to the system component(s). The image data 321 may include raw image data or image data processed by the user device 110 before sending to the system component(s). The image data 321 may be used in various manners by different components of the system to perform operations such as determining whether a user is directing an utterance to the system, interpreting a user command, responding to a user command, etc. In some implementations, the system 300 may receive and/or generate personal context data 367, which may be used to process a user input, generate a response thereto, and/or to perform a corresponding action. The command data 203 and/or the other input data 205 may include and/or be determined from one or more of audio data 311, text data 313, image data 321, and/or personal context data 367.

The wakeword detection component 320 of the user device 110 may process the audio data, representing the audio 310, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 310, is analyzed to determine if specific characteristics of the audio data match preconfigured acoustic waveforms, audio signatures, or other data corresponding to a wakeword.

Thus, the wakeword detection component 320 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 320 and/or input is detected by an input detector, the user device 110 may "wake" and begin transmitting audio data 311, representing the audio 310, to components of the user device 110 and/or the system component(s) 120 for processing. The audio data 311 may include data corresponding to the wakeword; in other embodiments, the portion of the audio corresponding to the wakeword is removed by the user device 110 prior to sending the audio data 311 to the system component(s) 120. In the case of touch input detection or gesture-based input detection, the audio data may not include a wakeword.

In at least some embodiments, the components of the user device 110 (e.g., on-device components) and the system component(s) 120 may have different processing capabilities. For example, on-device components may be configured to handle natural language user inputs may correspond to local-type natural language user inputs, such as those controlling devices or components associated with a user's home. In such circumstances the on-device components may be able to interpret and respond to a local-type natural language user input without incurring latency associated with sending data to and from the system component(s) 120. If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s) 120.

In some embodiments, the user device may include a hybrid selector that may handle arbitration of on-device execution versus remote execution on the system component(s) 120. The hybrid selector may send the audio data 311 to the wakeword detection component 320. The wakeword detection component 320 may return an indication, that a wakeword was not detected. In response to receiving such an indication, the hybrid selector may refrain from sending the audio data 311 to the system component(s) 120, and may prevent the ASR component of the user device 110 from further processing the audio data 311. In this situation, the audio data 311 can be discarded.

If the wakeword detection component 320 detects a wakeword in the audio data 311, the wakeword detection component 320 may send an indication of such detection to the hybrid selector. In response to receiving the indication, the hybrid selector may send the audio data 311 to the system component(s) 120 and/or the acoustic model 240*a* of the user device 110. The hybrid selector (or other component) may associate a unique identifier with each natural language user input. The user device 110 may include the unique identifier when sending the audio data 311 to the system component(s) 120, and the response data from the system component(s) 120 may include the unique identifier to identify which natural language user input the response data corresponds. The hybrid selector may wait for response data from either or both of the system component(s) 120 or the local language processing component(s). The hybrid selector may control execution of local language processing, such as by sending "execute" and "terminate" events/instructions. An "execute" event may instruct a component of the user device 110 to continue any suspended execution (e.g., by instructing the component to execute on a previously determined intent in order to determine a directive). Meanwhile, a "terminate" event may instruct the component(s) of the user device 110 to terminate further execution, such as when the user device 110 receives directive data from the system component(s) 120 and the hybrid selector determines to execute the directive. The hybrid selector may thus prevent duplicated and/or erroneous handling of user inputs.

In some implementations, the system 300 may include more than one system component(s) 120. The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 320 may result in sending audio data to first system component(s) 120 for processing while detection of the wakeword "Robot" by the wakeword detector may result in sending audio data to second system component(s) 120 for processing. The system may have a separate wakeword and system for different skills/systems (e.g., "Gaming Central" for a game play skill/system component(s)) and/or such skills/systems may be coordinated by one or more skill components 390*a*, 390*b*, 390*c*, etc. (collectively "skill component(s) 390") of the user device 110 and/or system component(s) 120.

Upon receipt by the system 300, the audio data 311 may be sent to an orchestrator component 330 and/or the LM orchestrator component 230. The orchestrator component 330 may include memory and logic that enables the orchestrator component 330 to transmit various pieces and forms of data to various components of the system, as well as perform other operations as described herein. In some embodiments, the orchestrator component 330 may optionally be included in the system component(s) 120. In embodiments where the orchestrator component 330 is not included in the system component(s) 120, the audio data 311 may be sent directly to the LM orchestrator component 230. Further, in such embodiments, each of the components of the system component(s) 120 may be configured to interact with the LM orchestrator component 230, the action plan execution component (action plan executor) 350, the API provider component, and/or other component(s).

The LM orchestrator 230 include memory and logic that enables the LM orchestrator 230 to generate prompts for the LM 260, delegate tasks/subtasks, and perform other actions via an action plan executor 350. The LM orchestrator 230 may transmit various pieces and forms of data to various components of the system 100/300, as well as perform other operations as described herein. The LM orchestrator 230 may receive various inputs corresponding to a user command, and create a prompt for the LM 260 structured such that the LM 260 can identify and parse the command, identify data to be processed, identify data representing parameters for the processing, etc. A complex task may include subtasks. For each subtask, the LM orchestrator 230 may create a new prompt (e.g., by adding new data to a previous prompt). The new prompt may give the LM 260 context for performing the next subtask. For example, a first subtask may involve obtaining information from an external resource. In response to a first prompt, the LM 260 may output a call to an API and receive a response. A second subtask may involve generating a response for output to the user 5. The LM orchestrator 230 may create a second prompt that includes the API response. In response to the second prompt, the LM 260 may generate an output to the user 5 based on the API response.

The LM orchestrator 230 may generate prompts for complex tasks (e.g., a task involving multiple subtasks and/or involving processing data from different sources and/or of different types). The LM orchestrator 230 may insert separator tokens between different segments of data in a prompt. A segment of data may represent an input received from the user 5, an output previously generated by the LM 260, and/or data received by the LM 260 from an external resource. Different segments of data in a prompt may correspond to different data types (e.g., audio or text) or data formats (e.g., raw audio or acoustic tokens). Thus, the LM 260 may be trained to recognize the separator tokens in an input sequence 215 (e.g., a prompt) and/or generate appropriate tokens at the appropriate positions of an LM output data 245 (e.g., a response).

The LM orchestrator 230 may identify other actions indicated by the LM 260, and orchestrate execution of those actions using the action plan executor 350. Operation of the LM orchestrator 230 and the action plan executor 350 are described in further detail below with reference to FIG. 4. The LM orchestrator 230 may identify a responsive output in the LM output data 245, and route it to the rendering model 380 and/or a vocoder 580 for conversion to audio data 314. The rendering model 380 may upsample the relatively coarse output of the LM 260 (e.g., speech tokens) into a higher-fidelity representation suitable for conversion, by a vocoder 580, to audio data 314 that may be output to the user. In some cases, the rendering model 380 may apply certain voice characteristics to the speech based on speaker embedding data (e.g., representing a target speaker's voice such as the voice corresponding to a virtual assistant) retrieved from a voice data storage component 595. The rendering model 380 and vocoder 580 are described in further detail below with reference to FIGS. 5C and 5D.

In some embodiments, the system component(s) 120 may include an arbitrator component 340, which may be configured to determine whether the orchestrator component 330 and/or the LM orchestrator component 230 is to provide a response to the user 5. In some embodiments, the LM orchestrator component 230 may be selected to process with respect to the audio data 311 only if the user 5 associated with the audio data 311 (or the user device 110 that captured the audio 310) has previously indicated that the LM orchestrator component 230 may be selected to process with respect to user inputs received from the user 5.

In some embodiments, the arbitrator component 340 may determine the orchestrator component 330 and/or the LM orchestrator component 230 are to process with respect to the audio data 311 based on metadata associated with the audio data 311. For example, the arbitrator component 340 may be a classifier configured to process a textual (e.g., content) representation of the audio data 311 (e.g., output by the LM 260) and classify the corresponding user input as to be processed by the orchestrator component 330 and/or the LM orchestrator component 230. For further example, the arbitrator component 340 may determine whether the device from which the audio data 311 is received is associated with an indicator representing the audio data 311 is to be processed by the orchestrator component 330 and/or the LM orchestrator component 230. As an even further example, the arbitrator component 340 may determine whether the user 5 (e.g., determined using data output from a user recognition component) from which the audio data 311 is received is associated with a user profile including an indicator representing the audio data 311 is to be processed by the orchestrator component 330 and/or the LM orchestrator component 230. As another example, the arbitrator component 340 may determine whether the user has invoke (e.g., using a wakeword) a virtual assistant corresponding to the orchestrator component 330 or an agent corresponding to the LM orchestrator 230. As another example, the arbitrator component 340 may determine whether the audio data 311 (or corresponding content data) corresponds to a request representing that the audio data 311 is to be processed by the orchestrator component 330 and/or the LM orchestrator component 230 (e.g., a request including "let's chat" may represent that the audio data 311 is to be processed by the LM orchestrator component 230).

In some embodiments, the arbitrator component 340 may send the audio data 311 to both of the orchestrator component 330 and the LM orchestrator component 230. The arbitrator component 340 may do so if it determines that a confidence score corresponding to whether the orchestrator component 330 and/or the LM orchestrator component 230 is to process the input is below a threshold. In such embodiments, the orchestrator component 330 and/or the LM orchestrator component 230 may include further logic for determining further confidence scores during processing representing whether the orchestrator component 330 and/or the LM orchestrator component 230 should continue processing, as is discussed further herein below.

The arbitrator component 340 may send the audio data 311 to the acoustic model 240*a*. In some embodiments, the component selected to process the audio data 311 (e.g., the orchestrator component 330 and/or the LM orchestrator component 230) may send the audio data 311 to the acoustic model 240*a*. The acoustic model 240*a* may convert the audio data 311 into input acoustic token data for processing by the LM 260. The LM 260 may transcribe the input acoustic token data into output content token data (e.g., representing text data). The content token data may represent one or more than one (e.g., in the form of an N-best list) ASR hypotheses representing speech represented in the audio data 311.

In some implementations, the audio data 311 may be transcribed using an ASR component (not shown). Such an ASR component may process the audio data 311 using one or more DNN ASR models. An ASR model may be, for example, a recurrent neural network such as an RNN-T. The ASR model may predict a probability (y|x) of labels $y=(y_1, \ldots y_u)$ given acoustic features $x=(x_1, \ldots, x_t)$. During inference, the ASR model can generate an N-best list using, for example, a beam search decoding algorithm. The ASR model may include various neural networks and arithmetic components such as an encoder, a prediction network, a joint network, and a softmax. The encoder may be similar or analogous to an acoustic model and may process a sequence of acoustic input features to generate encoded hidden representations. The prediction network may be similar or analogous to a language model and may process the previous output label predictions, and map them to corresponding hidden representations. The joint network may be, for example, a feed forward neural network (NN) that may process hidden representations from both the encoder and prediction network, and predict output label probabilities. The softmax component may be a function implemented (e.g., as a layer of the joint network and/or a separate arithmetic block) to normalize the predicted output probabilities (e.g., such that the probabilities sum to 1). The ASR component may send the text data to the arbitrator component 340, the orchestrator component 330, and/or the LM orchestrator component 230. In instances where the text data is sent to the arbitrator component 340, the arbitrator component 340 may send the text data to the component selected to process the audio data 311 (e.g., the orchestrator component 330 and/or the LM orchestrator component 230). The text data sent from the ASR component to the arbitrator component 340, the orchestrator component 330, and/or the LM orchestrator component 230 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 330 may cause a NLU component (not shown) to perform processing with respect to the ASR data generated by the ASR component and/or LM 260. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the user device 110, the system component(s) 120, a skill component 390, a skill system component(s) 325, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the user device 110. In another example, if the ASR data corresponds to "turn off the lights," the NLU component may determine an intent that the system turn off lights associated with the user device 110 or the user 5. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 330. The orchestrator component 330 may forward the NLU results data to a skill component(s) 390. If the NLU results data includes a single NLU hypothesis, the NLU component and the orchestrator component 330 may direct the NLU results data to the skill component(s) 390 associated with the NLU hypothesis. If the NLU results data includes an N-best list of NLU hypotheses, the NLU component and the orchestrator component 330 may direct the top scoring NLU hypothesis to a skill component(s) 390 associated with the top scoring NLU hypothesis. The system may also include a post-NLU ranker which may incorporate other information to rank potential interpretations determined by the NLU component.

In some embodiments, after determining that the orchestrator component 330 and/or the LM orchestrator component 230 should process with respect to the input data 401, the arbitrator component 340 may be configured to periodically determine whether the orchestrator component 330 and/or the LM orchestrator component 230 should continue processing with respect to the input data 401. For example, after a particular point in the processing of the orchestrator component 330 (e.g., after performing NLU, prior to determining a skill component 390 to process with respect to the input data 401, prior to performing an action responsive to the user input, etc.) and/or the LM orchestrator component 230 (e.g., after selecting a task to be completed, after receiving the action response data from the one or more components, after completing a task, prior to performing an action responsive to the user input, etc.) the orchestrator component 330 and/or the LM orchestrator component 230 may query the arbitrator component 340 has determined that the orchestrator component 330 and/or the LM orchestrator component 230 should halt processing with respect to the input data 401. As discussed above, the system 300 may be configured to stream portions of data associated with processing with respect to a user input to the one or more components such that the one or more components may begin performing their configured processing with respect to that data as soon as it is available to the one or more components. As such, the arbitrator component 340 may cause the orchestrator component 330 and/or the LM orchestrator component 230 to begin processing with respect to a user input as soon as a portion of data associated with the input data 401 is available (e.g., the ASR data, context data, user recognition, etc.). Thereafter, once the arbitrator component 340 has enough data to perform the processing described herein above to determine whether the orchestrator component 330 and/or the LM orchestrator component 230 is to process with respect to the user input, the arbitrator component 340 may inform the orchestrator component 330 and/or the LM orchestrator component 230 to continue/halt processing with respect to the user input at one of the logical checkpoints in the processing of the orchestrator component 330 and/or the LM orchestrator component 230.

As discussed herein above, in some embodiments, the LM shortlister component 440 (e.g., via an API retrieval component and/or a shortlister language model) may be configured to select the orchestrator component 330 to process with respect to the user input and/or a current task to return action response data (e.g., the action response data 455*a*) representing a response to the user input/current task or a description of an action the orchestrator component 330 may cause to be performed in response to the user input/current task. As such, in some embodiments, although the LM orchestrator component 230 is determined to process with respect to a user input, the LM orchestrator component 230 may determine, during such processing, that the orchestrator component 330 should process with respect to the user input.

A skill system component(s) 325 may communicate with a skill/app component(s) 390 within the system component(s) 120 directly with the orchestrator component 330 and/or the action plan executor 350, or with other components. A skill system component(s) 325 may be configured to perform one or more actions. An ability to perform such action(s) may sometimes be referred to as a "skill." That is, a skill may enable a skill system component(s) 325 to execute specific functionality in order to provide data or perform some other action requested by a user. For example, a weather service skill may enable a skill system component(s) 325 to provide weather information to the system component(s) 120, a car service skill may enable a skill system component(s) 325 to book a trip with respect to a taxi or ride sharing service, an order pizza skill may enable a skill system component(s) 325 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 390 dedicated to interacting with the skill system component(s) 325. Unless expressly stated otherwise, reference to a skill, skill device, or skill component may include a skill component 390 operated by the system component(s) 120 and/or skill operated by the skill system component(s) 325. Moreover, the functionality described herein as a skill or skill may be referred to using many different terms, such as an action, speechlet, bot, app, or the like. The skill component 390 and or skill system component(s) 325 may return output data to the orchestrator component 330.

The user device 110 may include still image and/or video capture components such as a camera 718 or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 311 representing the commands to the system component(s) 120 for processing, after which the system component(s) 120 may return output data that can cause the user device 110 to engage its camera.

In at least some embodiments, the system component(s) 120 may receive the audio data 311 from the user device 110, process speech corresponding to a spoken input in the received audio data 311, and perform functions in response to the recognized speech. In at least some embodiments, these functions may involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may direct the user device 110 to output an audible response (e.g., using speech synthesis processing performed by the LM 260 and/or an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

In at least some embodiments, the user device 110 may include, or be configured to use, one or more skill components that may work similarly to the skill component(s) 390 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 325. For example, a skill system component(s) 325 may be located in a remote environment (e.g., separate location) such that the user device 110 may only communicate with the skill system component(s) 325 via the network(s) 199. However, the disclosure is not limited thereto. For example, in at least some embodiments, a skill system component(s) 325 may be configured in a local environment (e.g., home server and/or the like) such that the user device 110 may communicate with the skill system component(s) 325 via a private network, such as a local area network (LAN).

In some implementations, the system 300 may include a TTS component (not shown). The TTS component may generate audio data (e.g., synthesized speech) from text data (e.g., content token data) using one or more different methods. Text data input to the TTS component may come from the LM 260, a skill component 390, the orchestrator component 330, or another component of the system. The TTS component may include a preprocessing component for converting text data and/or other input data into a form suitable for processing using various TTS techniques. The preprocessing component may include functionality and/or components for performing text normalization, linguistic analysis, linguistic prosody generation, or other such operations. During text normalization, the preprocessing component may first process the text data and generate standard text, converting such things as numbers, abbreviations (such as Apt., St., etc.), symbols ($, %, etc.) into the equivalent of written out words. During linguistic analysis, a preprocessing component may analyze the language in the normalized text to generate a sequence of phonetic units corresponding to the input text. This process may be referred to as grapheme-to-phoneme conversion. Phonetic units include symbolic representations of sound units to be eventually combined and output by the system as speech.

The output of the preprocessing component may be a symbolic linguistic representation, which may include a sequence of phonetic units. The TTS component may retrieve one or more previously trained and/or configured TTS models from a voice profile storage. A TTS model may be, for example, a neural network model that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation.

A TTS model may represent a particular speaker identity and may be conditioned based on speaking style, emotion, etc. In some implementations, a particular speaker identity may be associated with more than one TTS model; for example, with a different model representing a different speaking style, language, emotion, etc. in some implementations, a particular TTS model may be associated with more than one speaker identity; that is, be able to produce synthesized speech that reproduces voice characteristics of more than one character. Thus a first TTS model may be used to create synthesized speech for the first natural language processing system component(s) 120 while a second, different, TTS model may be used to create synthesized speech for the second natural language processing system component(s) 120. In some cases, the TTS model may generate the desired voice characteristics based on conditioning data received or determined from the text data and/or the other input data. In some implementations, the TTS component may synthesize speech using method called unit selection. In unit selection, the TTS component may match text data against a database of recorded speech. The TTS component may select matching units of recorded speech and concatenate the units together to form audio data. In some implementations, the TTS component may synthesize speech using method called parametric synthesis, the TTS component may vary parameters such as frequency, volume, and noise to create audio data including an artificial speech waveform. The output of some speech synthesis techniques may include spectrogram data, which represents the energy content at each frequency band with a "frame" of audio data. A frame of audio data may represent several milliseconds (e.g., 10, 20, 30, etc.) of audio data.

The TTS component may convert spectrogram data to waveform data using a computerized voice generator, sometimes called a vocoder. The vocoder may be, for example, a universal neural vocoder based on Parallel WaveNet or related model. The vocoder may take as input audio data in the form of, for example, a Mel-spectrogram with 80 coefficients and frequencies ranging from 50 Hz to 12 kHz. The vocoder may process the spectrogram data and convert it to a time-domain audio format (e.g., pulse-code modulation (PCM), waveform audio format (WAV), μ-law, etc.) that may be readily converted to an analog signal for amplification and output by a loudspeaker. The resulting audio data may consist of, for example, 8-, 16-, or 24-bit audio having a sample rate of 16 kHz, 24 kHz, 44.1 kHz, etc. In some implementations, other bit and/or sample rates may be used. A digital-to-analog convertor (DAC) may convert the audio data to an analog signal suitable for amplification and output as audio by a loudspeaker 712 such as a loudspeaker 712 of the user device 110.

The system 300 (either on user device 110, system component(s) 120, or a combination thereof) may include profile storage 370 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 370 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 370 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 3 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. Furthermore, various components shown in FIG. 3 and/or the functions they perform may be duplicated, divided, and/or shared between the system component(s) 120 and user device 110.

Figure 4:
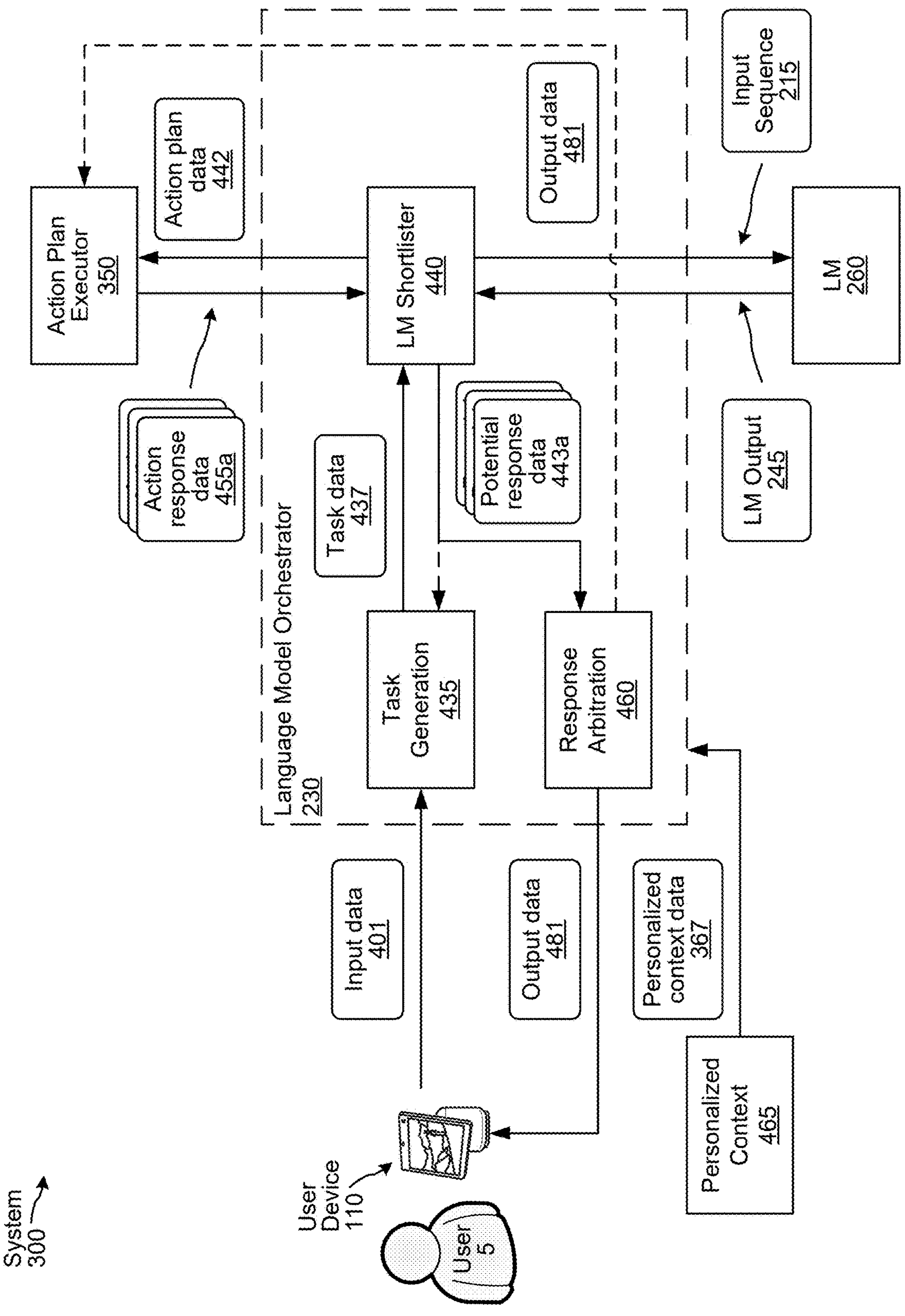
FIG. 4 is a conceptual diagram illustrating LM components of the natural language processing system in further detail, according to embodiments of the present disclosure.

FIG. 4 is a conceptual diagram illustrating LM components of the natural language processing system 300 in further detail, according to embodiments of the present disclosure. The system 300 may include a user device 110, local to a user 5, in communication with a system component(s) 120 via a network(s) 199. The network(s) 199 may include the Internet and/or any other wide- or local-area network, and may include wired, wireless, and/or cellular network hardware. The system component(s) 120 may include various components, such as the LM orchestrator component 230, a personalized context component 465, and the action plan executor 350. The LM orchestrator component 230 may include a task generation component 435, a LM shortlister component 440, and a response arbitration component 460. In some embodiments, one or more of the LM orchestrator component 230, the task generation component 435, the LM shortlister component 440, and/or the response arbitration component 460 may correspond to a trained LM. In some embodiments, one or more of the LM orchestrator component 230, the task generation component 435, the LM shortlister component 440, and/or the response arbitration component 460 may call upon the LM 260 to perform inferences with respect to an input sequence 215.

In some embodiments, the LM orchestrator component 230 may generate an input sequence 215 representing a prompt for input to the LM 260 (and/or other LMs of the system 100/300). The system component(s) 120 may receive input data 401, which may be provided to the LM orchestrator component 230. As discussed above, in some instances, the input data 401 may correspond to various data types, such as text (e.g., a text or tokenized representation of a user input), audio, image, video, etc. For example, the user input data may include input text (or tokenized) data when the user input is a typed natural language user input. For further example, prior to the LM orchestrator component 230 receiving the input data 401, another component (e.g., the LM 260 and/or an ASR component) of the system 300 may receive audio data representing the user input. The LM 260 and/or ASR component may perform speech-to-text processing on the audio data to determine ASR data corresponding to the user input, which may correspond to a transcript of the user input. As described above, with respect to FIG. 3, the ASR component may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input data 401 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 300 may include one or more components configured to process such user inputs to generate the text or tokenized representation of the user input (e.g., the input data 401).

In some embodiments, the LM orchestrator component 230 may receive other input data (e.g., other input data 205), which may be processed in a similar manner as the input data 401 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 300 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 300 may include one or more components configured to process the input data to generate a natural language representation of the input data. The system 300 may process the input data and may perform an action. For example, in response to detecting a garage door opening, the system 300 may cause garage lights to turn on, living room lights to turn on, etc. As another example, in response to detecting an oven beeping, the system 300 may cause a user device 110 (e.g., a smartphone, a smart speaker, etc.) to present an alert to the user. The LM orchestrator component 230 may process the input data to generate tasks that may cause the foregoing example actions to be performed.

The input data 401 may be received at the task generation component 435 of the LM orchestrator component 230, which may be configured to generate a list (e.g., one or more) of subtasks (e.g., steps/actions) that are to be completed in order to perform an action responsive to the user input and select a task of the list of the tasks that is to be completed first (e.g., in a current iteration of processing by the LM 260). For example, for a user input of "How is today's weather looking," the task generation component 435 may generate a list of subtasks of "(1) determine current outside temperature from thermostat; and (2) determine weather forecast for today" and select the subtask of "determine weather forecast for today" to be completed first. In instances where the task generation component 435 generates more than one subtask to be completed in order to perform the task responsive to the user input, the task generation component 435 may further maintain and prioritize the list of subtasks. In other words, as the system 300 processes to complete the list of subtasks, the task generation component 435 may (1) incorporate the potential responses associated with completed subtasks into data provided to other components of the system 300; (2) update the list of subtasks to indicate completed (or attempted, in-progress, etc.) subtasks; (3) generate an updated prioritization of the subtasks remaining to be completed (or tasks to be attempted again); and/or (4) determine an updated current subtask to be completed. The task generation component 435 may generate and send task data 437 representing the selected subtask to be completed and various other information needed to perform further processing with respect to the task (e.g., the input data 401, an indication of the selected subtask, potential responses associated with previous subtasks, the remaining subtask(s), and context data associated with the input data 401) to the LM shortlister component 440.

The LM shortlister component 440 may be configured to determine one or more components (e.g., responding components and/or external resources such as other agents, tools, APIs, skill component(s) 390, language model agent component(s), TTS component, etc.) configured to perform an action related to the user input or the current subtask. The LM shortlister component 440 may further be configured to generate and cause the execution of a request(s) (e.g., an API call(s), an incomplete API call/API call format, an indication of an action to be performed by a component, etc.) for the one or more components to provide a potential responses(s) to the user input or current subtask (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task. For example, for a current task of "determine weather forecast for today," the LM shortlister component 440 may generate requests of "use Weather Application A to determine weather forecast for today" and "use Weather Application B to determine weather forecast for today," or the like. Such requests may be represented in the action plan data 442 sent to the action plan executor 350. The action plan executor 350 may identify the request(s) in the action plan data 442, generate executable API calls corresponding to the request(s), and cause the corresponding components (e.g., the responding component, such as the API provider component, the language model agent component, the skill component 390, the TTS component, etc.) to generate action response data 455*a-n* representing the requested potential response(s), where individual action response data 455*a* may be provided by/correspond to a particular responding component-one of the API provider component, the language model agent component, the skill component 390, and/or the TTS component. In some embodiments, the action response data 455*a-n* may include an identifier (e.g., a component name, an alphanumerical value associated with the component, etc.) for the component providing the data. The LM shortlister component 440 receives and processes the action response data 455*a-n* and generates potential response data 443*a-n* representing the potential response(s) (e.g., relevant potential responses, selected potential responses, ranked potential responses, etc.) for further processing. If the LM shortlister component 440 determines that there are no remaining tasks to generate potential responses for, the LM shortlister component 440 may send the potential response data 443*a-n* to the response arbitration component 460.

The potential response data 443*a-n*, in some embodiments, may be determined based on receiving potential responses from various different components that may be relevant in responding to the input data 401. For example, the potential response data 443*a-n* may include a first potential response from a first component configured to perform a first task determined by the task generation component 435 (e.g., the responding component), a second potential response from a second component configured to perform a second task determined by the task generation component 435 (e.g., the responding component), etc. The potential response data 443*a-n* can include more than one potential response relating to an individual task. In some embodiments, the potential response data 443*a-n* may be natural language data.

The response arbitration component 460 processes the potential response data 443*a-n* to determine whether the potential responses generated for the one or more tasks are responsive to the user input. The response arbitration component 460 processes the potential response data 443*a-n* (representing at least the generated potential responses) and selects one or more of the potential responses that are determined to be responsive to the user input and/or determines that none of the actions are responsive to the user input. For example, the response arbitration component 460 may process the potential response data 443*a-n* to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like. In some embodiments, where the LM orchestrator component 230 determines a personality that is relevant to the user input, the response arbitration component 460 may further generate the natural language summary to be in a style corresponding to the personality.

In some embodiments, the language models (e.g., the LM 260 and/or LMs associated with the LM orchestrator component 230, the task generation component 435, the LM shortlister component 440, and the response arbitration component 460) may be fine-tuned to perform a particular task(s). Fine-tuning of the language models (e.g., the LM orchestrator component 230, the task generation component 435, the LM shortlister component 440, and the response arbitration component 460) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 300 discussed herein above may be configured to begin processing with respect to data as soon as the data or a portion of the data is available to the one or more components. Some components of the system 300 are generative components/models that can begin processing with respect to portions of data as they are available, instead of waiting to initiate processing after the entirety of data is available. In other words, the system 300 may be configured to stream portions of data associated with processing with respect to a user input to the one or more components such that the one or more components may begin performing their configured processing with respect to that data as soon as it is available to the one or more components. For example, if the output of the task generation component 435 and/or the LM shortlister component 440 indicates that additional information is needed to complete a first task associated with a user input, a request for the additional information may be sent to the personalized context component 465 (which may be returned as personalized context data 367). Thereafter, the task generation component 435 and/or the LM shortlister component 440 may continue to process to complete their configured operations. For example, while the personalized context component 465 is processing to determine the additional information, the system 300 may begin processing with respect to a second task associated with the user input. Thereafter, the output of the personalized context component 465 may be sent to the response arbitration component 460 such that once the response arbitration component 460 receives the output of the LM shortlister component 440, the response arbitration component 460 may resolve the ambiguity that resulted in the request for additional information in order to generate the responsive output data 481. For further example, if the input data 401 is generated to include the natural language representation of the user input, but the processing required to determine the corresponding contextual signals (e.g., weather data, time of data, dialog history, device information, etc.) is yet to be completed, the task generation component 435 may begin processing with respect to the natural language representation of the user input. Once the corresponding contextual signals have been generated, the task generation component 435 may begin processing with respect to the contextual signals and may update downstream components with the result of the processing with respect to the contextual signals.

As another example, if the task generation component 435 determines that more than one task is to be completed to perform an action responsive to a user input, and the LM shortlister component 440 processes as described herein above to cause one or more components to generate potential responses with respect to a first task of the more than one tasks, the LM shortlister component 440 may send the potential responses (and a representation of the user input and the current task) to the response arbitration component 460 to process as described herein above with respect to those potential responses while the system 300 (e.g., the task generation component 435 and/or the LM shortlister component 440) completes processing with respect to the remaining tasks of the one or more tasks. Therefore, the response arbitration component 460 may process as described herein to select between the potential responses associated with the first task while the potential responses associated with one or more of the remaining tasks is completed. As such, the response arbitration component 460 may only need to arbitrate between the potential responses associated with the first task that were previously selected by the response arbitration component 460 as being responsive to the first task when the response arbitration component 460 later processes with respect to further potential responses associated with further tasks.

As described above, the LM 260 may be configured to perform processing, for example segmented processing, with regard to tokens representing input speech. In some embodiments, the LM 260 may be further designed to process, understand, and/or generate multi-modal data including audio, text, image, video, and/or other types of data. The LM 260 may thus be built using deep learning techniques, such as neural networks, and may be trained on extensive datasets that include text (or other type of data, such as multi-modal data including text, audio, image, video, etc.) from a broad range of sources, such as old/permitted books, images, videos, websites, etc. for multi-modal/natural language processing. The system 300 may thus operate a variety of generative models including a speech-to-speech model (that may process audio data and generate audio embedding data/audio tokens that can be used to generate synthesized speech), text-to-speech model (that may process text data or other textual representations and generate audio embedding/token data), speech-to-text model (that may process audio data and generate text data or other textual representations), image-to-text model (that may process image (or video) data and generate text data or other textual representations), text-to-image data (that may process text or other textual representations and generate image (or video) data), a multi-modal generative model (that may process one or more types of input data (e.g., text, audio and/or image) and generate one or more types of output data (e.g., text, audio, and/or image)), and other types. Such a multi-modal LM capable of performing segmented processing is shown in FIG. 6.

Figure 5A:
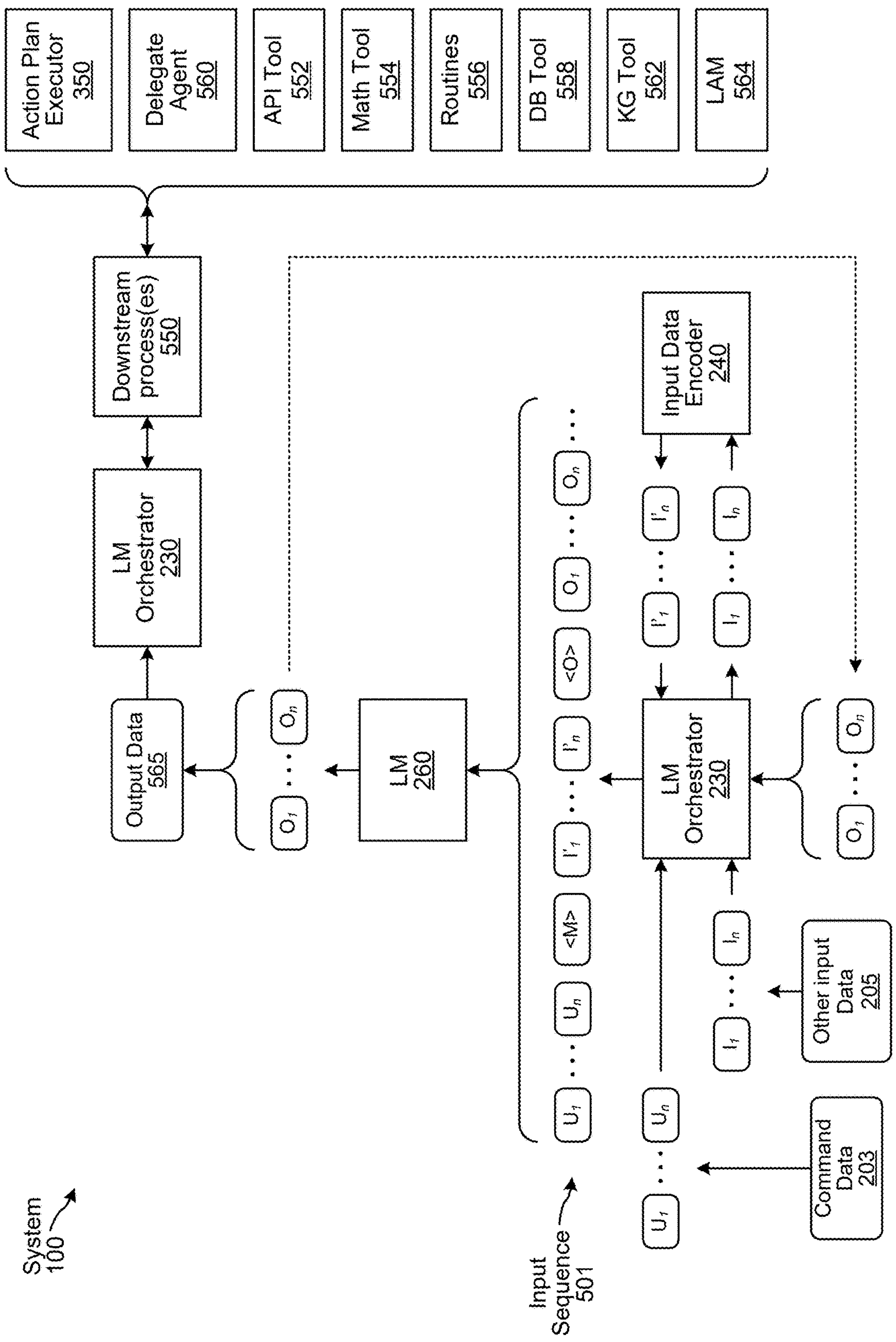
FIG. 5A illustrates example operations of prompt generation in an LM system, according to embodiments of the present disclosure.

FIG. 5A illustrates example operations of prompt generation in the LM system 100, according to embodiments of the present disclosure. In the example operations shown in FIG. 5A, the LM orchestrator 230 and the LM 260 are processing two different segments on input data; however, the same operations may be extended to more segments and/or to different data modalities. The LM orchestrator 230 may receive command data 203 and other input data 205. The command data 203 may be in the form of tokens $U_1$, $U_2$, $U_3 \ldots U_n$. Similarly, the other input data 205 may be in the form of tokens $I_1$, $I_2$, $I_3 \ldots I_n$. In some cases, the LM orchestrator 230 convert the other input data 205 into another form using one of the input data encoders 240 to generate processed input data $I'_1 \ldots I'_n$. For example, the other input data 205 may represent raw waveform audio data, and the LM orchestrator 230 may send it to an acoustic model 240*a* for conversion into audio token data $I'_1$, $I'_2$, $I'_3 \ldots I'_n$. Although not shown in the example operations of FIG. 5A, the system 100 may additionally or alternatively convert the command data 203.

The LM orchestrator 230 may determine positional data corresponding to each input (e.g., the command data 203, the other input data 205, etc.). The positional data may represent an order in which the data was received. The positional data may represent an order in which the LM 260 may process the inputs; that is, if a first input is used to process a second input, the positional data may reflect that the first input is to be placed first in an input sequence and the second input is to be placed after the first input. For more complex input sequences, such as when the LM 260 processes data in multiple turns, positional data may indicate that data output by the LM 260 in a previous turn should be appended to the end of the input sequence for the next turn. If new data is received between turns, such as when the LM 260 generates a request to an API or another LM, and the API/LM returns a response, the positional data for the request and response may indicate that the request should be appended to the previous sequence, followed by the response.

The LM orchestrator 230 may combine the command data 203 and processed input data 205 into an LM input sequence 501. The input sequence 501 may include the command data 203 tokens $U_1 \ldots U_n$ and processed input tokens $I'_1 \ldots I'_n$ separated by a separator token "<M>". The <M> token may indicate that data of a different segment and/or modality follows. The LM 260 may process the input sequence 501 to generate output data 565, which may consist of data tokens $O_1 \ldots O_n$. The LM orchestrator 230 may route the output data 565 to one or more downstream processes 550, which may include further processing, communication with other components of the system, and/or outputting a response to a user. The downstream processes 550 may include, for example, operations performed by the action plan executor 350, and/or external resources such as one or more delegate agents 560, and/or tools. In the case of delegated tasks/subtasks, the resources may return data to the agent, and the LM orchestrator 230 may generate a new input sequence 501 for processing by the LM 260.

When performing complex tasks, previous outputs of the LM 260 may be added to the prompt for performing the next subtask. Thus, the LM orchestrator 230 may add to the next input sequence 501 a separator token "<O>" followed by the output tokens $O_1 \ldots O_n$.

In some implementations, the LM orchestrator 230 may create an input sequence 501 containing other various types of data including a representation of a natural language input from a user (e.g., in the form of acoustic and/or content token data), a machine-generated instruction, context data (e.g., from the user device that received the input, from one or more system components, and/or from another user device or devices), previous input and/or output data, previous API calls and/or observations, and/or information in other formats of data that the LM 260 has been configured to process (e.g., gestures represented in video data, a recognizable face or object in image data, a single or time-series measurement taken with a sensor, etc.). The LM orchestrator 230 may combine the prompt tokens, acoustic tokens, and/or any tokens previously predicted by the LM 260, delineated with appropriate separator tokens.

In some implementations, the LM 260 may be a multi-modal LM. A multi-modal LM can process and output data of more than one type at a time. For example, in addition to content data (e.g., representations of words/text), a multi-modal LM may be capable of processing audio data, video data, sensor data, image data, and/or other modalities of data. The data may be tokenized (e.g., encoded into a series of discrete values), encoded into an embedding, and/or in its raw form (e.g., untokenized, unencoded, and/or otherwise in a same or similar format as it was received and/or created). A multi-modal LM may perform speech-to-speech and other operations in which the model processes representations of input audio (e.g., speech) and/or other type(s) content (e.g., text, images, etc.) to generate representations of output audio and/or other type(s) of content. As an extension of such speech-to-speech functions, a multi-modal LM may be capable of performing ASR (in which a multi-modal LM receives representations of speech and outputs representations of text), TTS (in which a multi-modal LM receives representations of text and outputs representations of synthesized speech), machine translation (in which a multi-modal LM receives representations of speech in a first natural language and outputs representations of synthesized speech in a second natural language), and/or other functionalities.

A multi-modal LM may use these speech-to-speech capabilities to perform the functions of a conversational agent or other type of chatbot that can engage in a dialog with a user via speech, text, and/or other data modalities. For example, the user may communicate with the LM using voice and/or text. The user may input images and/or other data and ask the LM to answer questions about the input and/or perform other processing of the input. For example, a user may upload documents and request the LM to provide a summary. In some cases, the LM may translate the document and/or the summary into another language. The user may ask the LM to summarize unread emails (e.g., accumulating during a leave of absence) and describe them to the user in order of urgency and/or importance. Examples of multi-modal operation are described in additional detail below with reference to FIGS. 5B through 5D and 6.

In some implementations, the LM 260 may be configured to operate in a portion-wise fashion in which it is capable of processing a portion of an input and generate the corresponding portion of the output, prior to receiving a subsequent portion of the input. For example, at runtime/inference, each portion of input acoustic token data (e.g., representing a series of frames of audio data) may be shuttled to the LM 260 and added to the running autoregressive input (e.g., which, in a speech-to-text process, may also contain previously predicted output content tokens). The LM 260 may decode the transcript represented in the portion. The LM 260 may predict word pieces one-by-one until reaching an end-of-portion token. At this point, a decoding algorithm of the LM 260 may halt prediction until the LM 260 receives the next portion of input acoustic token data. Portion-wise processing may be used to improve the latency of certain operations of the LM 260 when processing data received over a period of time that is relatively long compared to the processing time of the LM 260 such a speech received over several seconds.

To enable this functionality, the LM 260 may be trained to include in its vocabulary one or more types of separator tokens (e.g., representing an end-of-portion and/or separations between tokens of different modalities). Several other aspects of the system 100 may be configured to allow portion-wise processing by the LM 260. First, the LM 260 may be trained to predict the end of a portion. The LM 260 may operate in an autoregressive manner in which it receives the input and predicts an output sequence of tokens (or, in the case of multi-modal operation, multiple parallel output sequences) where the LM 260 predicts each successive output token using the input data and previously predicted output tokens. The LM 260 may be trained to determine when it has generated an output sequence that represents all tokens of the current (and preceding) portion of input data. Upon making this determination, the LM 260 may output a token indicating an end-of-portion. The end-of-portion token may serve as (and/or trigger) a request for the next portion of input data.

Second, components upstream from the LM 260 may be configured to generate portions of input data for processing by the LM 260. For example, the LM orchestrator 230 may have input audio data (e.g., command data 203) processed by the acoustic model 240*a*. The acoustic model 240*a* may process the input audio data in portions (e.g., corresponding to a certain number of audio frames/audio tokens, and/or corresponding to a portion of speech up until a potential endpoint as determined by the acoustic model 240*a* based on, for example, a pause in speech of a certain length). The acoustic model 240*a* may be configured to determine a token size and/or a portion size. The token size may correspond to the number of audio frames that a single token represents.

The acoustic model 240*a* may determine the portion size (e.g., in number of tokens, frames, and/or milliseconds of audio) in various ways. For example, the acoustic model 240*a* may determine the portion size based on policy data (e.g., stored in a policy data storage component 635). The policy data may specify a portion size for a given task; for example, a first portion size may be used for low-latency tasks such as speech recognition for real-time close captioning, a second portion size larger than the first may be used for natural language command processing and/or chatbot applications, and a third portion size larger than the second portion size may be used for machine translation tasks where more lookahead information may increase the accuracy of the translation. In some cases, the acoustic model 240*a* may determine an appropriate portion size automatically based on the task (which may, in some cases, include processing some amount of input speech or text to identify the task to be performed). In some cases, the acoustic model 240*a* may determine an appropriate portion size depending on the modality(ies) involved; for example, depending on whether the modality is speech-to-text, text-to-speech, or speech-to-speech. In some cases, the acoustic model 240*a* may select an appropriate portion size based on characteristics of the input (e.g., based on the number of speakers, the volume of the speaker(s) and/or background noise, whether a speaker is whispering, etc.). In some cases, the portion size may be specified by the user; for example, for the particular task or as a global preference setting. In some cases, the acoustic model 240*a* may determine portion size based on a combination of some or all of the above factors. In any case, the acoustic model 240*a* may generate a portion and return it to the LM orchestrator 230 for prompting the LM 260 prior to an end of the input speech.

Determining an end of speech may be referred to as "speech endpointing." Endpointing may involve waiting for a period of time after the user has finished speaking and/or processing speech received to determine whether such speech likely represents a complete utterance (e.g., includes information sufficient to identify and execute a requested operation) or whether the user has paused mid-sentence (e.g., to think of the right word, due to an interruption, or otherwise) with intent to resume speaking. In some implementations, the endpoint decision may be made the LM 260 based on the content of the speech. In some implementations, the endpoint decision maybe made by one or more trained models and/or based on the output of one or more trained models. For example, an endpoint decision model may receive one or more of LM output data, ASR results data, NLU output data, dialog context, skill results, user data, etc. and determine whether an endpoint of speech has likely been reached at any point. The endpoint decision may lead to other actions by the system such as turning off a microphone, changing an indicator (e.g., a light), executing a command, outputting a response, entering a sleep mode, etc.

Third, the LM orchestrator 230 may be configured to generate LM prompts by sequencing together the portions of data generated by the acoustic model 240*a* and the portions of data generated by the LM 260 (e.g., based on previous portions of data generated by the acoustic model 240*a*).

In implementations where the LM orchestrator 230 and LM 260 process a stream of input data in a portion-wise manner, the LM orchestrator 230 and LM 260 may use a separator token as an indication of an end-of-portion, either as received from the acoustic model 240*a* or predicted by the LM 260. In some cases, the <M> or <O> token may serve to indicate to the LM orchestrator 230 or the LM 260 that the tokens that follow correspond to the next portion of input. If the LM 260 outputs an end-of-portion token, that may trigger the LM orchestrator 230 to send the next portion of input data for processing. A separator token at the end of the next input sequence 501 may indicate to the LM 260 to begin predicting output data 565 corresponding to the new portion of input data, and so on.

In various implementations, the data portions may vary in size from a few frames (e.g., where a frame of audio data represents 10, 20, 30, or 40 ms, etc. of audio) to a few seconds. The LM 260 may be trained using an aligned dataset in which the beginnings and endings of words are precisely labeled. The labels may allow the training to correlate a portion with the word(s) it represents. The training may teach the LM 260 to predict the end of a portion. The end-of-portion prediction may be used to request the next portion of input data. For example, in a speech-to-speech implementation, the end-of-portion prediction may be sent to an audio encoder to request the next portion of audio data. The LM 260 may be trained using portions of random portion length. This may allow the system to be post-configured for whatever portion size is appropriate for the given task. For example, larger portion sizes may improve accuracy while smaller portion sizes may reduce latency.

During inference, portion size may be selected by the user, preset for the requested task, and/or configured dynamically by the system based on context. The system may use different portion sizes depending on the constraints for a given task. For example, performing ASR for real-time closed captioning of audio and/or video may benefit from low-latency transcription. Accordingly, the portion size may be set to a relatively short duration such as 0.5 s to 2 s. Thus, the system may be able to generate subtitles for a movie or TV show such that the words appear on screen only a short time after being spoken or while being spoken (if audio data buffering is available).

A longer portion size may be appropriate in, for example, a machine translation implementation. Due to rules of grammar and/or common usage, the order of words in one language may be different from the order of words in another language. Accordingly, the portion size may be set to a relatively high duration such as 2 s to 10 s. This may give the LM 260 adequate "lookahead" information for processing the input and generating an output in which words and/or phrases appear in different positions within the output sequence relative to the positions of corresponding words and/or phrases in the input sequence.

Intermediate portion sizes may be appropriate in, for example, natural language command processing and/or chatbot applications. When the system is acting as a virtual assistant or conversational agent, portion size may be configured to balance accuracy and latency. Accordingly, the portion size may be set to a relatively moderate duration such as 1 s to 3 s. This may allow the system to effectively extract meaning from the input while keeping latency acceptable for generating replies in a conversational context and/or performing commands for the user without excessive delay.

In some uses cases, the system may dynamically change portion sizes to process different portions of an input and/or successive inputs from a multi-turn interaction. For example, the system may default to an intermediate portion length suitable for natural language processing. A user may speak to a device of the system and request a task for which a different portion size may be better suited. For example, the user may say, "Alexa, please provide live transcription of the following speech." The system may process this portion of the input using the intermediate portion size and then switch to a smaller portion size to reduce the user-perceived latency associated with the live transcription. In another example, the user may say, "Alexa, please translate the following speech into English." The system may again begin with the default portion size before switching to a larger portion size that may provide a more accurate translation.

The LM orchestrator 230 may receive the output data 565 and route it to one or more downstream processes 550, which may include further processing, communication with other components of the system, and/or outputting a response to a user. The downstream processes 550 may include, for example, operations performed by the action plan executor 350, a large action model (LAM) 564, and/or external resources such as other agents, and/or tools.

An agent may have tools available to it. Similar to cooperating agents, an agent may leverage such tools may allow the agent to augment its capabilities and perform a wider variety of tasks for the user, and perform them more accurately and/or completely than it may otherwise be capable of. The tools may include an API tool 552, a math tool 554, a routines tool 556, a database (DB) tool 558, and/or a knowledge graph (KG) tool 562. The API tool 552 may include software and/or hardware configured to facilitate communication between the agent and one or more APIs. In some implementations, the API tool 552 may translate or convert messages that include natural language portions into API calls for the appropriate API. Similarly, the API tool 552 may translate or convert API responses into a format usable by the agent. The API tool 552 may present an interface through which the agent can leverage various functions including, for example, audio functions of a media playback device, environmental settings of a smart-home thermostat, etc. These functions may themselves be an abstraction of multiple operations; for example, the audio API may handle the commands Play, Next, and Stop; and the thermostat API may handle the commands GetState, SetTemp, SetMode, etc.

The math tool 554 may include software and/or hardware configured to implement calculator functions such as described above in the powers-of-two example. The math tool 554 may receive mathematical exercises, problems, formulae, etc., from an agent and perform the calculation accurately.

The routines tool 556 may include software and/or hardware configured to detect and/or periodically check for the occurrence of an event or presence of a condition. Upon detecting the condition or occurrence, the routines tool 556 may perform a predefined action and/or send a notification to an agent. The routines tool 556 may facilitate an agent's ability to perform tasks that involve the passage of time (e.g., between the user inputs the command and when the action is to be performed). The Robot/Alexa light switch example above is an example use of such a routines tool 556.

The DB tool 558 may include software and/or hardware configured to provide a mechanism by which the agent may query and/or update a database (e.g., using structured query language (SQL) or the like). In some implementations, the DB tool 558 may facilitate other database operations. Similarly, the KG tool 562 may include software and/or hardware configured to facilitate the identification and retrieval of information from a structured knowledge graph. This may allow the agent to answer factual questions more accurately than using a LM-based approach alone.

The LAM 564 may include software and/or hardware configured to provide the agent with a means of interacting with certain resources in a manner similar and/or analogous to the way a human would, and without the use of an API. The LAM 564 may include one or more machine learning models configured to interact with computing resources, such as websites, apps, applications, etc., via a GUI and/or VUI. The LAM 564 may "read" and process text, symbols, and/or images displayed in the GUI. The LAM 564 may determine how to use the GUI to perform the action requested by the user. The LAM 564 may generate or obtain data to input via the GUI. The LAM 564 may select links, menu items, settings, etc., via the GUI. The LAM 564 may obtain outputs from the GUI and convey them to the user. In some cases, the LAM 564 and/or LM 260 may convert and/or translate the data; for example, by converting text to speech, translating from one language to another, etc. In various use cases, the LAM 564 may interact with a GUI on behalf of an individual who is visually impaired, operating a motor vehicle, and/or otherwise wishes to interact with the resource using speech. In some cases, the user may configure the LM 260 and/or LAM 564 to perform automated tasks; for example, purchasing concert tickets immediately upon release or entering a last-minute or last-second bid in one or more online auctions.

Figure 5B:
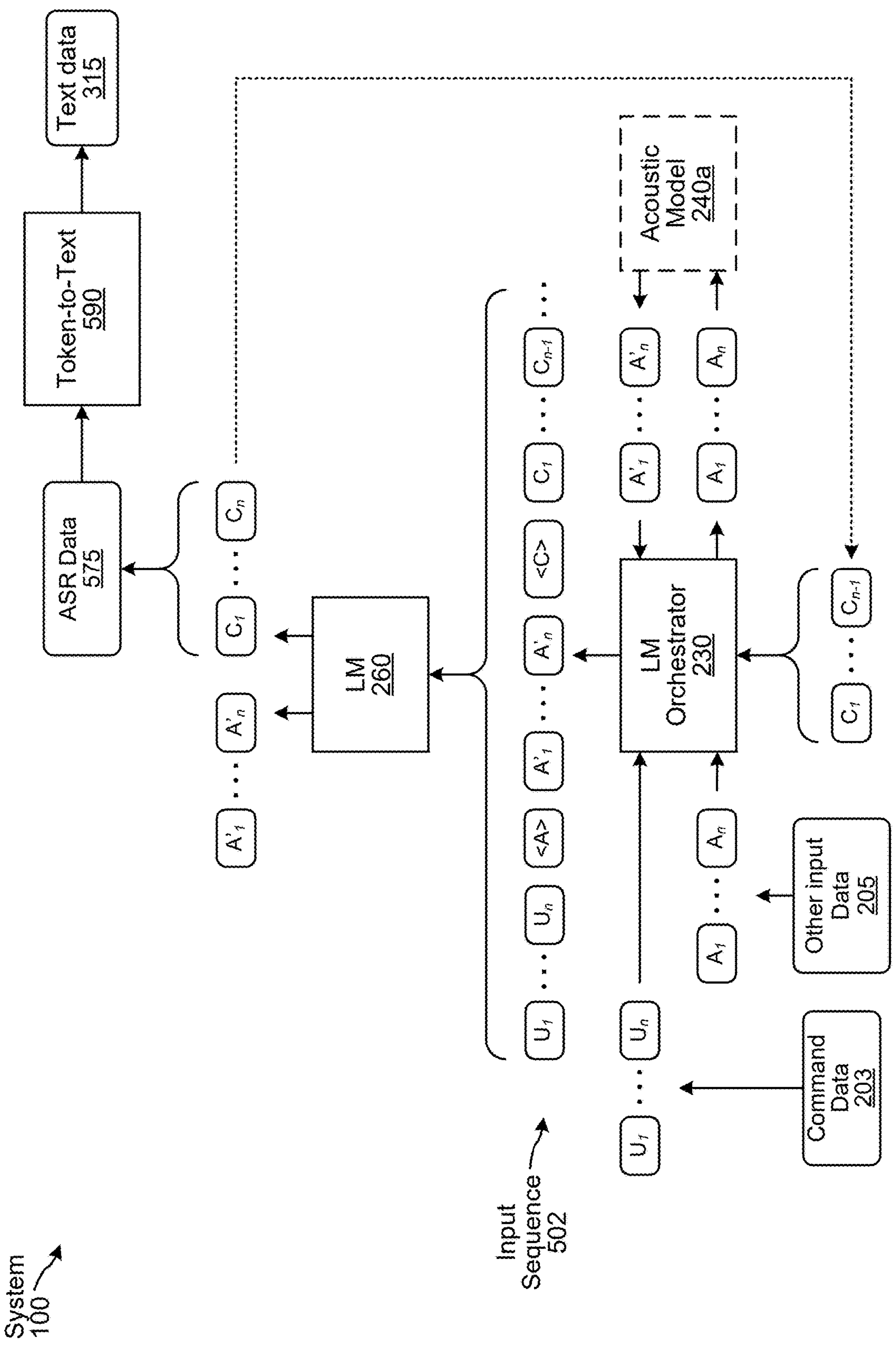
FIG. 5B illustrates example operations of prompt generation in a multi-modal LM system performing speech recognition, according to embodiments of the present disclosure.
Figure 5C:
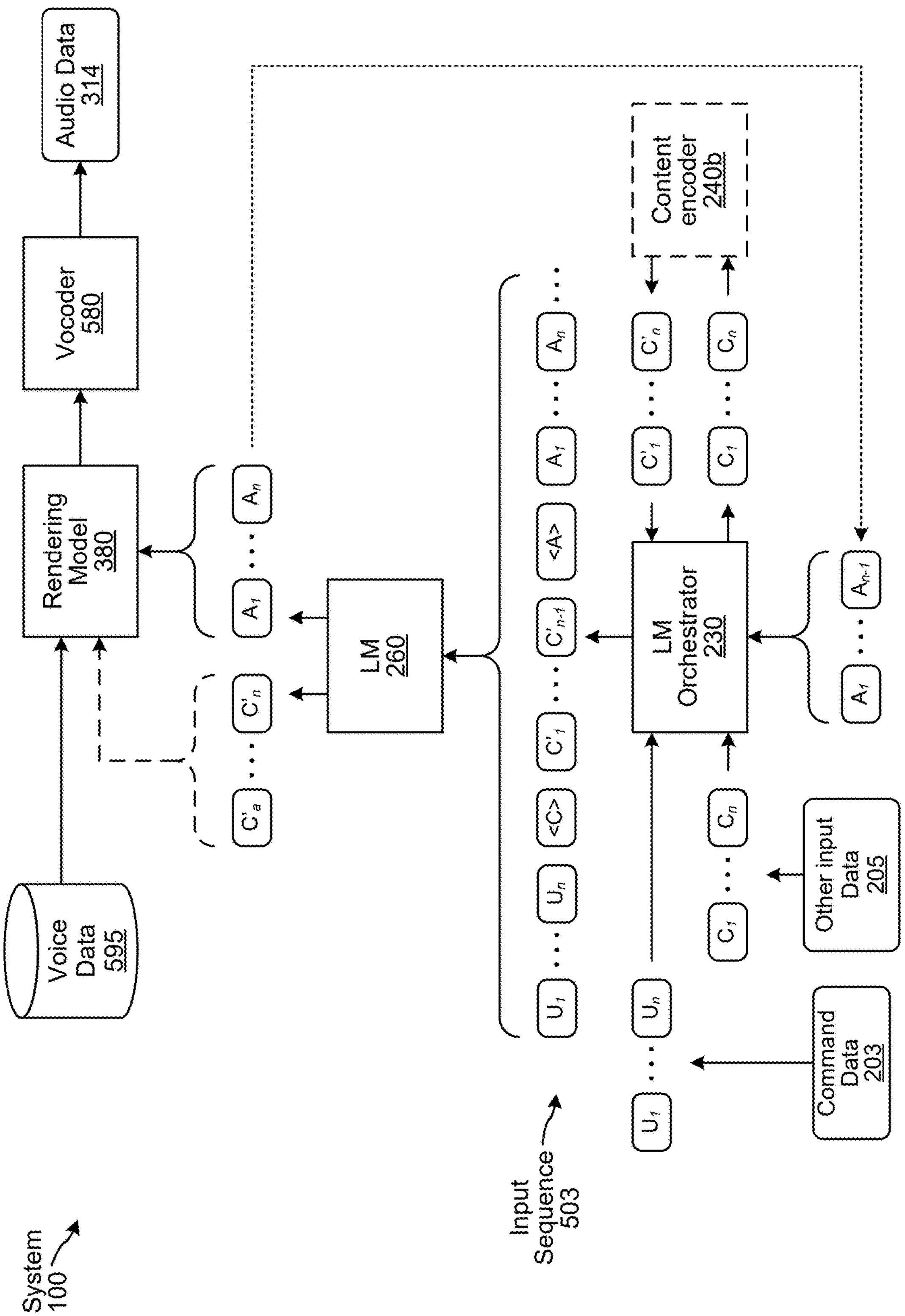
FIG. 5C illustrates example operations of prompt generation in a multi-modal LM system performing speech synthesis, according to embodiments of the present disclosure.
Figure 5D:
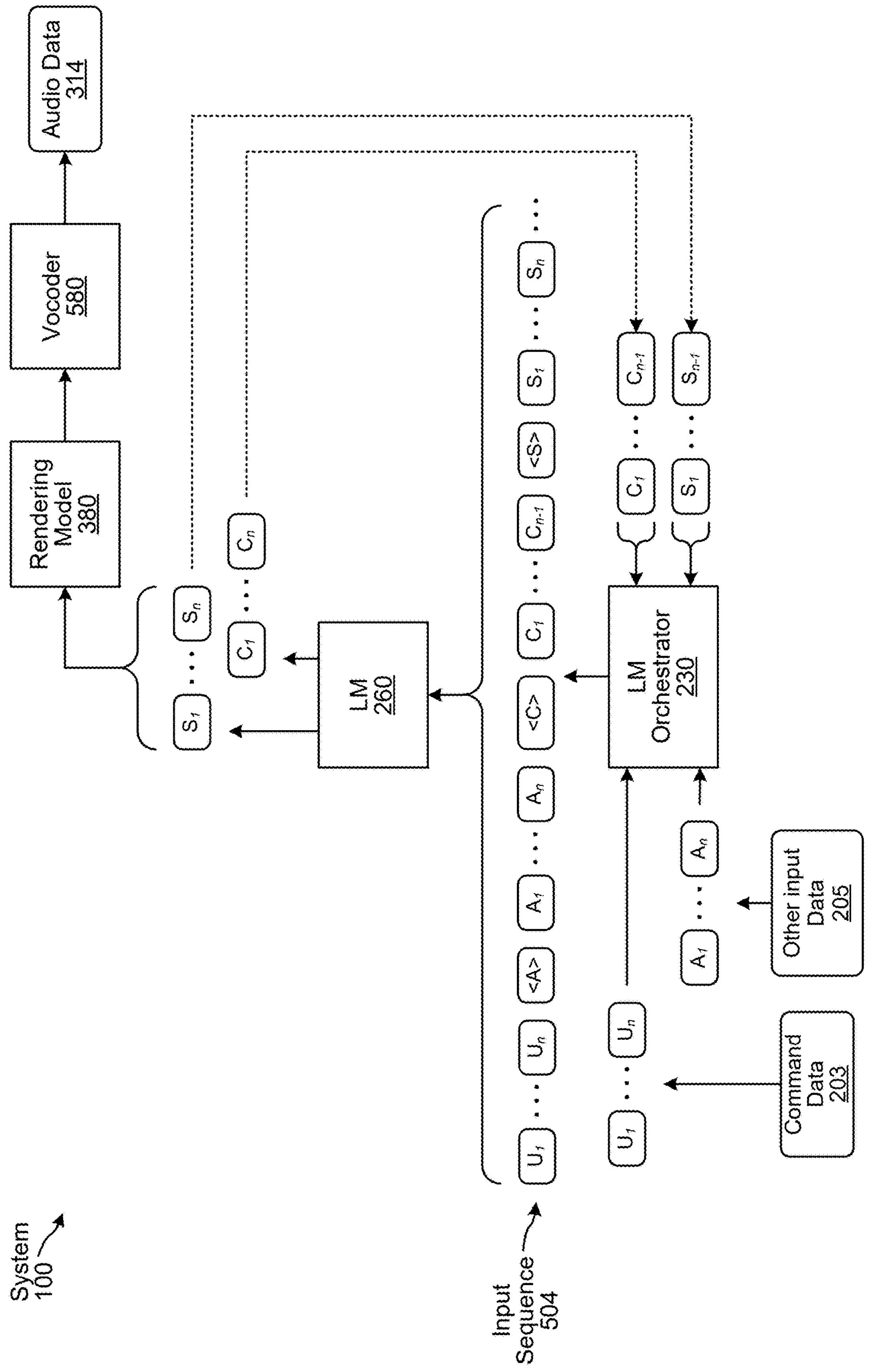
FIG. 5D illustrates example operations of the prompt generation component in a multi-modal LM system performing speech-to-speech functions, according to embodiments of the present disclosure.

FIGS. 5B through 5D illustrate three different speech-to-speech operations performed using the system 100. FIG. 5B illustrates example operations of prompt generation in a multi-modal LM system performing speech recognition, according to embodiments of the present disclosure. The system 100 may receive command data 203 indicating a request to transcribe other input data 205 representing target audio. The other input data 205 may include frames of audio data $A_1$ through $A_n$. The LM orchestrator 230 may receive the frames of audio data and send them to the acoustic model 240*a*. The acoustic model 240*a* may convert the frames of audio data into audio tokens $A'_1$ through $A'_n$. The LM orchestrator 230 may create an input sequence 502 using the command data 203 $U_1$ through $U_n$ and audio tokens $A'_1$ through $A'_n$. The LM orchestrator 230 may separate the command data 203 and acoustic tokens using a "<A>" separator token (e.g., indicating a beginning of a segment of acoustic tokens).

The LM 260 may process the input sequence 502 to predict output acoustic tokens $A'_1$ through $A'_n$ and content tokens $C_1$ through $C_n$. The content tokens $C_1$ through $C_n$ may make up the ASR data 575, which may be consumed by one or more downstream processes 550. The LM 260 may operate in an autoregressive manner. Thus, the LM 260 may predict each successive content token $C_n$ based on the previously predicted content tokens $C_1$ through $C_{n-1}$. In some cases, the LM 260 may output the separator token "<A>" to indicate an end-of-portion (e.g., of content tokens). The <A> separator token can indicate to the acoustic model 240*a* and/or the LM orchestrator 230 that the next portion of acoustic tokens should begin there. In some cases, the LM 260 may output a start-of-speech token (e.g., "<SOS>") indicating the beginning of a transcription of input speech. The LM 260 may generate output acoustic tokens and/or output content tokens. The LM orchestrator 230 may receive the generated tokens and add them to the input sequence 502 for subsequent steps of the task. When the LM 260 predicts an end-of-portion, the LM 260 may request the next segment of input content token data from the LM orchestrator 230.

In some implementations, the system 100 may convert the ASR data 575 (which may consist of content tokens) to text. The system 100 may include a token-to-text component 590. The token-to-text component 590 may convert the ASR data 575 to text data 315 for further processing and/or output as human-readable text. In some implementations, the token-to-text component 590 may be, for example, a combination of software and/or logic configured to convert teach token and/or segments of tokens into a corresponding text word (and/or individual characters, subwords, phrases, etc.). In some implementations, the token-to-text component 590 may include a machine learning model such as a recurrent neural network (RNN) trained to process the ASR data 575 to determine corresponding text data 315. The LM orchestrator 230 may route the ASR data 575 and/or the text data 315 to one or more downstream processes 550 for further processing/output.

In addition to speech-to-text (e.g., ASR), the configuration shown in FIG. 5B may also be used (or modified for use) in related tasks such as speaker-attributed ASR, in which the system 100 transcribes speech and identifies the speaker of each utterance, and/or speech-to-API, in which input speech is converted to an API call. The operations shown in FIG. 5B may be extended to include speaker-attributed ASR. A user may provide additional input data 205 representing a voice sample (and perhaps additional voice samples). The LM orchestrator 230 may leverage a reference encoder 240*c* to generate a speaker embedding, which the LM 260 may use to determine which portions of the speech in the target audio correspond to which voice sample.

In some cases, these speech-to-text functions may be performed as part of a complex task; for example, speaker-attributed ASR. The system 100 may receive a speech sample and audio data representing a speech dialog, generate a transcript of the speech, and attribute various portions of the transcript to a speaker whose voice characteristics match the speech sample. The system 100 may receive the inputs as follows:

User: "Decode the speech of each of the speakers and assign labels."

User: "Here's the audio of speaker Mike" user uploads Mike's vocal sample

User: "Here's the audio of speaker Eddie" user uploads Eddie's vocal sample

User: "Here's the target audio."<user uploads target audio containing conversation>

The LM orchestrator 230 may create the prompt sequence using the command data 203 ("Decode the speech . . . ") and various pieces of input data 205 including Mike's vocal sample, Eddie's vocal sample, and the target audio to be transcribed. The LM orchestrator 230 may separate each segment of data using a separator token. The LM orchestrator 230 may include a separator token at the end of the target audio (e.g., the end of the prompt) to indicate to the LM 260 that it is to begin generating an output. The LM orchestrator 230 may send the prompt to the LM 260. The LM 260 may generate the following response:

LM 260: <spoken words of speaker 1>{"speaker": "Mike"}<spoken words of speaker 2>{"speaker": "Eddie"}

The system 100 may output this response to the user in the form of a transcript with indications of the speaker corresponding to each portion.

In the above example, the multi-modal LM system 100 receives various audio data inputs (e.g., the command data 203, the first input data 205*a*, the second input data 205*b*, and/or third input data 205*c*, etc.); however, the command data 203 may indicate that different inputs are to be processed differently. For example, while the command data 203 indicates that the target audio is to be transcribed, the first and second audio data are not. Rather, the command data 203 indicates that the first and second data are to have voice characteristics extracted to allow the LM 260 to determine which portion of the target audio data corresponds to which speaker.

The LM orchestrator 230 may include an input data handler that can have input data processed according to the data type and/or for the purpose for which the data was provided. In the speaker-attributed ASR example, the command data 203 and target audio may be tokenized (e.g., using an audio encoder) for processing as natural language by the LM 260. The vocal samples may be encoded (e.g., using a reference encoder) to generate a speaker embedding representing voice characteristics that the LM 260 may use to correlate portions of the transcript to the corresponding speaker. Thus, the system 100 may include one or more input data encoders 240*a*, 240*b*, 240*c*, etc. (collectively "input data encoders 240"). The input data handler can send various items of input data to the appropriate input data encoder 240 for conversion, feature extraction, and/or other processing.

FIG. 5C illustrates example operations of prompt generation in a multi-modal LM system performing speech synthesis, according to embodiments of the present disclosure. In text-to-speech operations, the system 100 may receive command data 203 indicating a request to process other input data 205 representing content for output as synthesized speech. The LM orchestrator 230 may receive the other input data in the form of content data $C_1$ through $C_n$. The LM orchestrator 230 may leverage a content encoder 240*b* to process the other input data to determine content tokens $C'_1$ through $C'_n$.

The text-to-speech operations may be similar to the speech-to-text operations illustrated in FIG. 5B; however, rather than predict each output content token autoregressively based on previously predicted output content tokens, the LM 260 may predict output acoustic tokens autoregressively based on previously predicted output acoustic tokens. For example, the LM 260 may each output acoustic token $A_n$ based on the previously predicted output acoustic tokens $A_1$ through $A_{n-1}$. At each step, the LM orchestrator 230 may add the newly predicted output acoustic token to the input sequence 503, and the LM 260 may predict the next output acoustic token.

The LM 260 may send the output acoustic token data $A_1$ through $A_n$ to the rendering model 380 for upsampling to high-fidelity audio token data, which the vocoder 580 may convert to waveform audio data (e.g., the output audio data 314). The system 100 may send the output audio data 314 to a user device 110 for output to a user.

The LM 260 may output acoustic tokens representing the various sounds of speech. The rendering model 380 may process the acoustic tokens produce a speech output (e.g., audio data 314 representing synthesized speech). The rendering model 380 may be a neural network configured to upsample the relatively "coarse" acoustic tokens (e.g., as output by the acoustic model 240*a* and/or LM 260) into higher-fidelity audio tokens, which may be used for high-quality rendering. In some implementations, the rendering model 380 may receive speaker profile information representing speaker-dependent voice characteristics, and use it to generate output speech having the desired voice. The rendering model 380 may retrieve the speaker profile information from, for example, a voice data storage component 595. The speaker profile information may include an embedding generated by an audio encoder, such as a neural network encoder, trained to identify different speakers (e.g., by using contrastive learning to extract unique voice characteristics from speech samples corresponding to different speakers). In some implementations, the rendering model 380 may additionally use the content tokens generated by the LM 260 to produce the output speech.

In some implementations, the system 100 may include a vocoder 580 such as a neural vocoder configured to process the rendered audio tokens to determine the audio data 314 (e.g., representing synthesized speech). The vocoder 580 may be, for example, a universal neural vocoder based on Parallel WaveNet or other model(s). The vocoder 580 may take as input audio data in the form of, for example, a Mel-spectrogram with 80 coefficients and frequencies ranging from 50 Hz to 12 kHz. The vocoder 580 may process the spectrogram data and convert it to a time-domain audio format (e.g., pulse-code modulation (PCM), waveform audio format (WAV), u-law, etc.) that may be readily converted to an analog signal for amplification and output by a loudspeaker. The resulting audio data may consist of, for example, 8-, 16-, or 24-bit audio having a sample rate of 16 kHz, 24 kHz, 44.1 kHz, etc. In some implementations, other bit and/or sample rates may be used. A digital-to-analog convertor (DAC) may convert the audio data to an analog signal suitable for amplification and output as audio by the loudspeaker 712.

FIG. 5D illustrates example operations of the prompt generation component in a multi-modal LM system performing speech-to-speech functions, according to embodiments of the present disclosure. The operations shown in FIG. 5D may be used to perform, for example, machine translation of speech, voice conversion (e.g., receiving speech and generating output having different voice characteristics), anonymization, etc. In some implementations, although not shown in FIG. 5D, the LM orchestrator 230 may encode the command data 203 and/or the other input data 205 using an input data encoder 240 (e.g., as shown in FIG. 5A). The LM orchestrator 230 may combine the encoded command data 203 (e.g., $U_1$ through $U_n$) and other input data 205 (e.g., $A_1$ through $A_n$) into an input sequence 504. The LM orchestrator 230 may then feed the input sequence 504 into the LM 260.

In speech-to-speech operations, the LM 260 may predict both output acoustic tokens and output content tokens autoregressively. For example, the LM 260 may, as a speech recognition function, predict the output content token data from the input acoustic token data. Similarly, the LM 260 may, as a speech generation function, predict the output acoustic token data from the predicted output content token data. The output acoustic token data may be upsampled by the rendering model 380 to generate high-fidelity audio token data. In some implementations, the rendering model 380 may also receive the output content token data and process it with the output acoustic token data (e.g., as shown in FIG. 5C). The vocoder 580 may convert the audio token data to waveform audio data (e.g., the output audio data 314).

FIG. 6 is a conceptual diagram of a multi-modal multi model LM system 100, according to embodiments of the present disclosure. As shown in FIG. 6, the multi-modal LM system 100 may receive input data 401 (e.g., input data 401 and/or other input data 205). The input data 401 may include one or more types of multi-modal data. For example, input data 401 may include audio data 311, text data 313, image data 321, video data 623, and/or other data 627. The input data 401 may be processed by one or more input data encoders 240, which may configure the data in a form usable by the downstream component(s). The one or more input data encoder(s) 240 may be configured depending on the type of input data 401 that is to be processed. For example, for input data 401 that includes audio data 311, the input data encoder(s) 240 may include an acoustic model 240*a* such as that discussed above with reference to FIG. 2A. For input data 401 that includes image data 321, the input data encoder(s) 240 may include a model configured to process image data into tokens representing image information, into feature data representing image characteristics, and/or into another form. For input data 401 that includes video data 623, the input data encoder(s) 240 may include a model configured to process video data into tokens representing video information, into feature data representing video characteristics, and/or into another form. The input data encoder(s) 240 may take other forms as well, for example to process other data 627. The input data encoder(s) 240 may use information from policy data storage component 635 to coordinate processing in a manger that segments/chunks data into a form usable by the LM orchestrator 230. The LM orchestrator 230 may operate in a similar manner to that described above, only with multi-modal instead of/in addition to audio data.

The LM 260 may process the multi-modal data to determine output data to pass to the rendering model 670. The output data sent from the LM 260 to the rendering model 670 may be text, audio, image, video, and/or other multi-modal data depending on system configuration. For example, the rendering model 670 may include an audio rendering model (such as 170 discussed above), an image rendering model (such as a diffusion model or the like), a video rendering model, etc. The rendering model 670 may rely on data from a rendering data component 675 which may provide data to the rendering model 670 to assist in the rendering of data for eventual configuration and output. For example, the rendering data component 675 may indicate style, resolution, time, or other characteristics corresponding to an ultimate output. Data from the rendering model 670 may be sent to an output configuration component 680 which may configure output data 481 for ultimate output/presentation. For example, in the case of rendered audio data, the output configuration component 680 may include a vocoder 580. In the case of rendered image data, the output configuration component 680 may include an image configuration component, in the case of rendered video data, the output configuration component 680 may include a video configuration component, etc. The ultimate output data 481 may thus include audio data 314, text data 315, image data 621, video data 625, and/or other data 629 depending on the system configuration and operation. The system 100 may thus use the multi-modal LM 260 of FIG. 6 to perform processing discussed herein (for example discussed with regards to FIGS. 5A through 5D, etc.) which may operate in the context of system 100, for example as described with regards to FIGS. 3 and 4.

Figure 7:
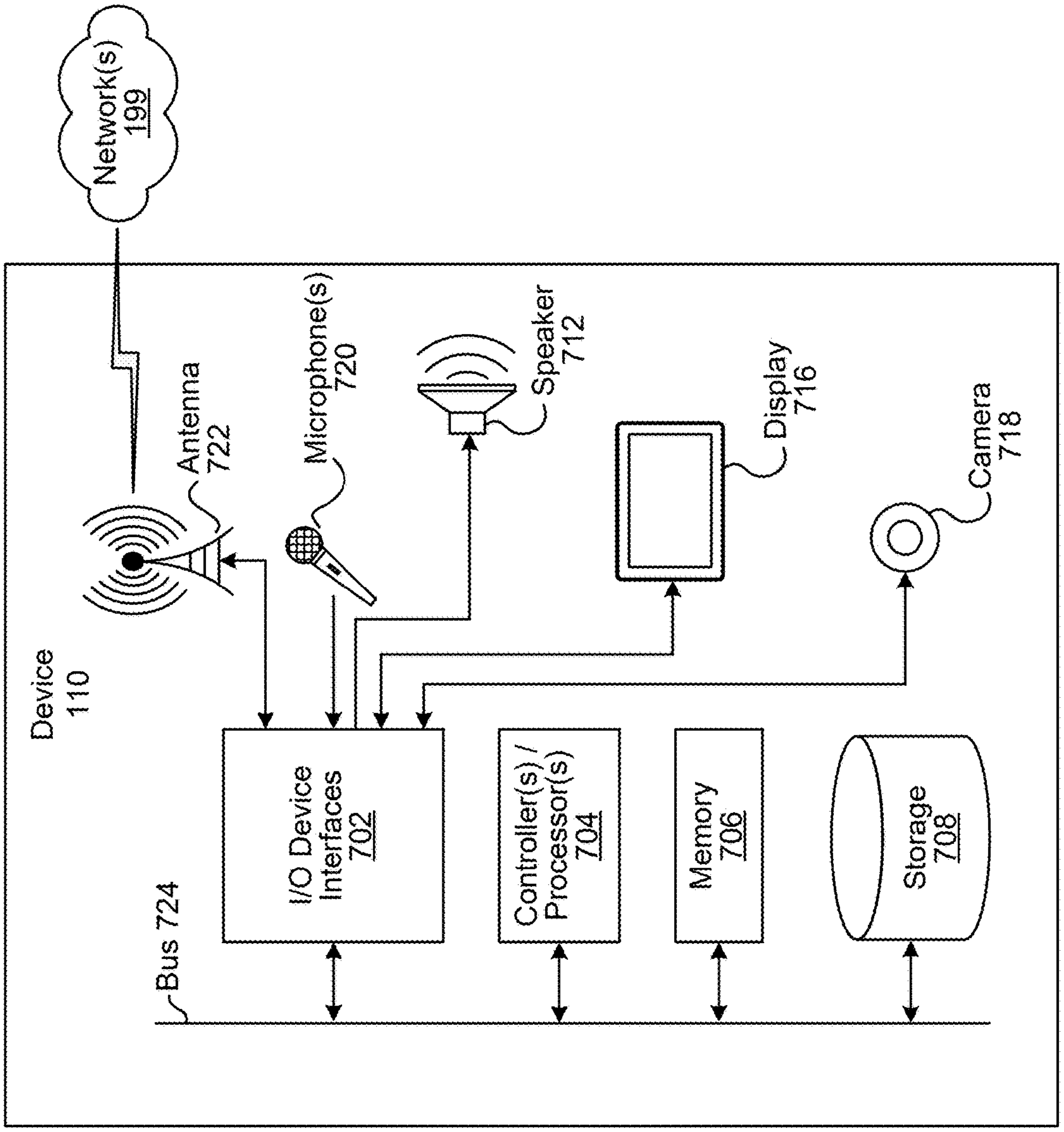
FIG. 7 is a block diagram conceptually illustrating example components of a device, according to embodiments of the present disclosure.
Figure 8:
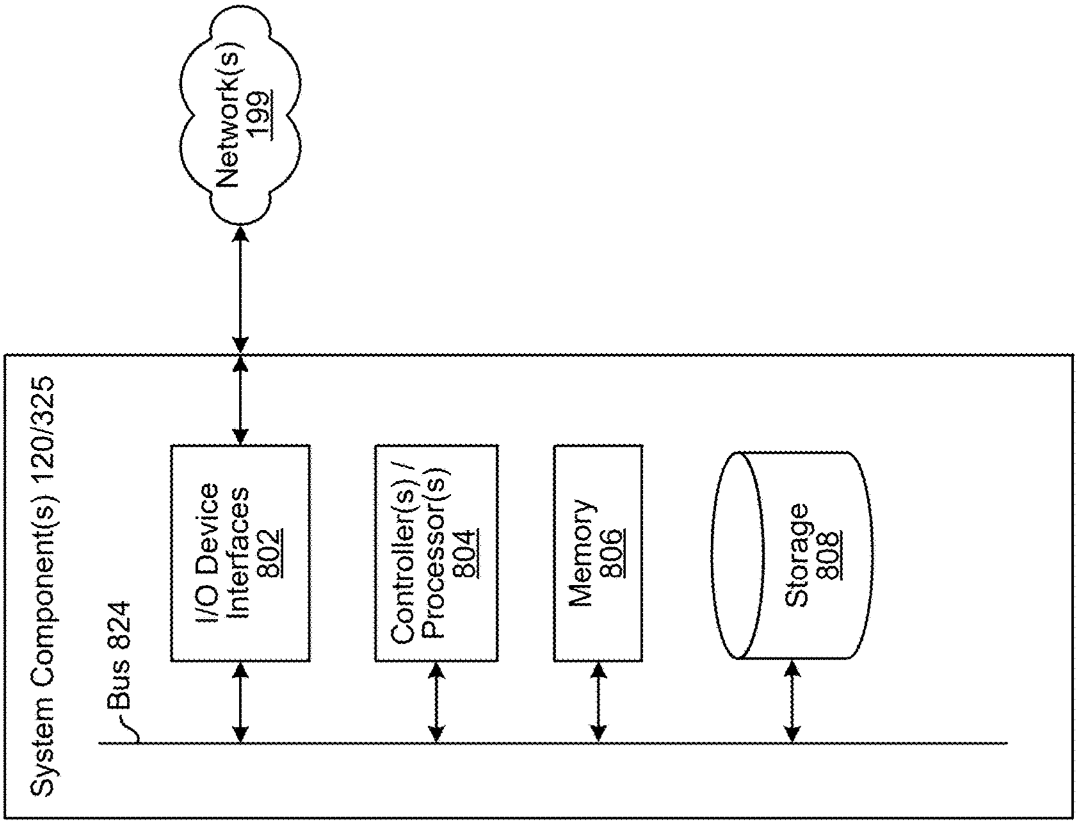
FIG. 8 is a block diagram conceptually illustrating example components of a system, according to embodiments of the present disclosure.

FIG. 7 is a block diagram conceptually illustrating a device 110 that may be used with the system 100 or 300. FIG. 8 is a block diagram conceptually illustrating example components of a system component 120 and/375 of the system 100 or 300. A system (120/375) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). A system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/375) may be included in the system 100 of the present disclosure, such as one or more natural language processing system component(s) 120 for performing ASR processing, one or more natural language processing system component(s) 120 for performing NLU processing, one or more skill system component(s) 325, etc. In operation, each of these systems may include computer-readable and computer-executable instructions that reside on the respective device (120/375), as will be discussed further below.

Each of these devices (110/120/375) may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each device (110/120/375) may also include a data storage component (708/808) for storing data and controller/processor-executable instructions. Each data storage component (708/808) may individually include one or more non-volatile storage types such as magnetic storage, optical storage, solid-state storage, etc. Each device (110/120/375) may also be connected to removable or external non-volatile memory and/or storage (such as a removable memory card, memory key drive, networked storage, etc.) through respective input/output device interfaces (702/802).

Computer instructions for operating each device (110/120/375) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/375) includes input/output device interfaces (702/802). A variety of components may be connected through the input/output device interfaces (702/802), as will be discussed further below. Additionally, each device (110/120/375) may include an address/data bus (724/824) for conveying data among components of the respective device. Each component within a device (110/120/375) may also be directly connected to other components in addition to (or instead of) being connected to other components across the bus (724/824).

Referring to FIG. 8, the device 110 may include input/output device interfaces 702 that connect to a variety of components such as an audio output component such as a loudspeaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 722, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the natural language command processing system component(s), or a skill system component(s) 325 may include their own dedicated processors, memory, and/or storage. Alternatively, one or more of the components of the device(s) 110, the natural language command processing system component(s), or a skill system component(s) 325 may utilize the I/O interfaces (702/802), processor(s) (704/804), memory (706/806), and/or storage (708/808) of the device(s) 110, natural language command processing system component(s), or the skill system component(s) 325, respectively. Thus, the ASR component may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 325, as described herein, are illustrative, and may be located as a stand-alone device or may be included, in whole or in part, as a component of a larger device or system. As can be appreciated, a number of components may exist either on a system component(s) and/or on device 110.

Figure 9:
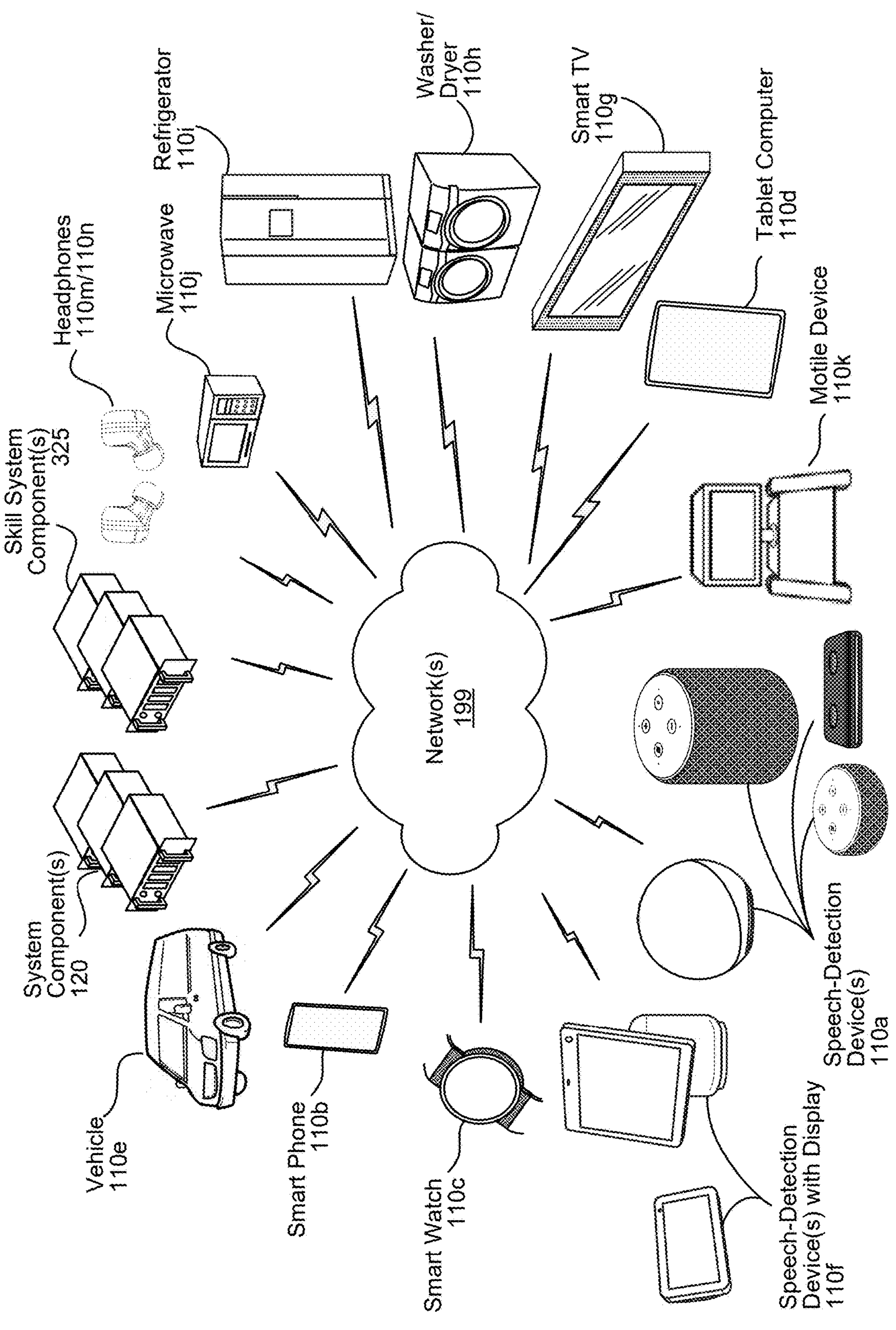
FIG. 9 illustrates an example of a network for use with the overall system, according to embodiments of the present disclosure.

As illustrated in FIG. 9, multiple devices (110*a*-110*n*, 120, 375) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component, the NLU component, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, by a first computer system corresponding to a first language model (LM) agent, first input data representing a first task to be performed by the first LM agent;

determining a first LM prompt using the first input data;

generating first LM output data by processing the first LM prompt using a first LM corresponding to the first LM agent;

determining that the first LM output data indicates a first subtask of the first task to be delegated to a second LM agent different from the first LM agent;

in response to determining that the first LM output data indicates the first subtask is to be delegated to the second LM agent, generating second LM output data by processing the first LM output data using the first LM, the second LM output data representing a natural language request to perform the first subtask and an indication that the natural language request is from the first LM agent;

sending the second LM output data to a second computer system corresponding to the second LM agent;

receiving, from the second computer system in response to the second LM output data, first data;

determining a second LM prompt using the first LM prompt, the first LM output data, and the first data;

generating third LM output data by processing the second LM prompt using the first LM;

determining that the third LM output data represents a response to the first input data; and in response to determining that the third LM output data represents a response to the first input data, causing a user device to present a first output corresponding to the third LM output data.

2. The computer-implemented method of claim 1, further comprising, prior to receiving the first input data:

receiving first text data representing natural language instructions for how the first LM agent is to handle a task, the first text data indicating:

a first message format corresponding to messages from users, the first message format including a first portion indicating that a message is from a user and a second portion representing a natural language user input, a second message format corresponding to messages from other LM agents, the second message format including a third portion identifying another LM agent and a fourth portion representing natural language generated by the other LM agent, a third message format corresponding to delegation requests to send to other LM agents, the third message format including a fifth portion indicating a delegation request, a sixth portion identifying a delegate LM agent, and a seventh portion representing a natural language message to the delegate LM agent, a first description of the first LM agent, the first description including a natural language description of first capabilities corresponding to the first LM agent, a second description of the second LM agent, the second description including an identifier corresponding to the second LM agent and a natural language description of second capabilities corresponding to the second LM agent, a first instruction for the first LM agent to determine whether the second LM agent is more capable of handling the task, and a second instruction to, in response to determining that the second LM agent is more capable of handling the task, delegate the task to the second LM agent; and determining the first LM prompt additionally using the first text data.

3. The computer-implemented method of claim 1, further comprising, prior to receiving the second LM output data:

sending, to the second LM agent, first text data representing natural language instructions for how the second LM agent is to handle a task, the first text data indicating:

a first message format corresponding to messages from other LM agents, the first message format including a first portion identifying another LM agent and a second portion representing a natural language message generated by the other LM agent, a second message format corresponding to responses to messages from other LM agents, the second message format including a third portion identifying the other LM agent and a fourth portion representing a natural language response, a natural language description of second capabilities corresponding to the second LM agent, a first instruction for the second LM agent to determine whether it is capable of handling the task from the other LM agent, a second instruction to, in response to determining that the second LM agent is capable of handling the task, generate a first response to the other LM agent by processing the natural language message using a second LM corresponding to the second LM agent, and a third instruction to, in response to determining that the second LM agent is not capable of handling the task, generate a second response to the other LM agent indicating that the second LM agent is unable to handle the task.

4. The computer-implemented method of claim 1, further comprising:

receiving second input data representing a second task;

generating, using the first LM, fourth LM output data representing a second subtask of the second task to delegate to the second LM agent upon detection of a triggering event;

determining, using the fourth LM output data, second data corresponding to the second subtask;

detecting an occurrence of the triggering event; and in response to detecting the occurrence, sending the second data to the second LM agent, the second LM agent performing the second subtask in response to receiving the second data.

5. A computer-implemented method comprising:

receiving, by a first computer system corresponding to a first language model (LM) agent, first input data;

sending, to a second computer system corresponding to a second LM agent different from the first LM agent, first data representing a request for a description of capabilities corresponding to the second LM agent;

receiving second data representing a description of capabilities corresponding to the second LM agent;

determining a first LM prompt using the first input data and the second data;

processing the first LM prompt using a first LM corresponding to the first LM agent to generate first LM output data representing a natural language request to delegate a first task to the second LM agent and an indication that the natural language request is from the first LM agent;

sending the first LM output data to the second computer system;

receiving, from the second computer system in response to the first LM output data, first third data;

generating second LM output data using the third data and the first LM, the second LM output data representing a response to the first input data; and sending the second LM output data to a first system component.

6. The computer-implemented method of claim 5, further comprising:

receiving fourth data representing natural language instructions for how the first LM agent is to handle a task, the second data indicating:

a first instruction for the first LM agent to determine whether the second LM agent is more capable of handling the task, and a second instruction to, in response to determining that the second LM agent is more capable of handling the task, delegate the task to the second LM agent; and determining the first LM prompt additionally using the fourth data.

7. The computer-implemented method of claim 5, further comprising:

receiving fourth data representing an identifier corresponding to the second LM agent; and determining the first LM prompt additionally using the fourth data.

8. The computer-implemented method of claim 5, further comprising:

receiving fourth data representing an identifier corresponding to a software component and a description of capabilities corresponding to the software component; and determining the first LM prompt additionally using the fourth data.

9. The computer-implemented method of claim 5, further comprising:

sending, to the second LM agent, fourth data representing natural language instructions for how the second LM agent is to handle a task, the second data indicating:

a first instruction for the second LM agent to determine whether it is capable of handling a task indicated in a message from another LM agent, a second instruction to, in response to determining that the second LM agent is capable of handling the task, generate a first response to an other LM agent by processing the message using a second LM corresponding to the second LM agent, and a third instruction to, in response to determining that the second LM agent is not capable of handling the task, generate a second response to the other LM agent indicating that the second LM agent is unable to handle the task.

10. The computer-implemented method of claim 5, further comprising:

receiving second input data;

generating, using the first LM, third LM output data representing a second task to delegate to the second LM agent upon detection of an event;

determining, using the third LM output data, second data corresponding to the second task;

detecting an occurrence of the event; and in response to detecting the occurrence, sending the second data to the second LM agent, the second LM agent performing the second task in response to receiving the second data.

11. The computer-implemented method of claim 5, further comprising:

receiving second data representing:

a first message format corresponding to messages from users, the first message format including a first portion indicating that a message is from a user and a second portion representing a natural language user input, a second message format corresponding to messages from other LM agents, the second message format including a third portion identifying another LM agent and a fourth portion representing natural language generated by the other LM agent, and a third message format corresponding to delegation requests to send to other LM agents, the third message format including a fifth portion identifying a delegate LM agent, and a sixth portion representing a natural language message to the delegate LM agent.

12. The computer-implemented method of claim 5, further comprising:
- receiving second input data;
- generating, using the first LM, third LM output data representing an application programming interface call to a software component;
- receiving, from the software component in response to the application programming interface call, an application programming interface response; and
- generating fourth LM output data using the application programming interface response and the first LM, the fourth LM output data representing a response to the second input data.

13. A first computer system, comprising:
- at least one processor; and
- at least one memory comprising instructions that, when executed by the at least one processor, cause the first computer system to:
  - receive, by a first computer system corresponding to a first language model (LM) agent, first input data;
  - send, to a second computer system corresponding to a second LM agent different from the first LM agent, first data representing a request for a description of capabilities corresponding to the second LM agent;
  - receive second data representing a description of capabilities corresponding to the second LM agent;
  - determine a first LM prompt using the first input data and the second data;
  - process the first LM prompt using a first LM corresponding to the first LM agent to generate first LM output data representing a natural language request to delegate a first task to the second LM agent and an indication that the natural language request is from the first LM agent;
  - send the first LM output data to a second computer system corresponding to the second LM agent;
  - receive, from the second computer system in response to the first LM output data, third data;
  - generate second LM output data using the third data and the first LM, the second LM output data representing a response to the first input data; and
  - send the second LM output data to a first system component.

14. The first computer system of claim 13, wherein the at least one memory further comprises instructions that, when executed by the at least one processor, further cause the first computer system to:
- receive fourth data representing natural language instructions for how the first LM agent is to handle a task, the second data indicating:
  - a first instruction for the first LM agent to determine whether the second LM agent is more capable of handling the task, and
  - a second instruction to, in response to determining that the second LM agent is more capable of handling the task, delegate the task to the second LM agent; and
- determine the first LM prompt additionally using the fourth data.

15. The first computer system of claim 13, wherein the at least one memory further comprises instructions that, when executed by the at least one processor, further cause the first computer system to:
- receive fourth data representing an identifier corresponding to the second LM agent; and
- determine the first LM prompt additionally using the fourth data.

16. The first computer system of claim 13, wherein the at least one memory further comprises instructions that, when executed by the at least one processor, further cause the first computer system to:
- receive fourth data representing an identifier corresponding to a software component and a description of capabilities corresponding to the software component; and
- determine the first LM prompt additionally using the fourth data.

17. The first computer system of claim 13, wherein the at least one memory further comprises instructions that, when executed by the at least one processor, further cause the first computer system to:
- send, to the second LM agent, second data representing natural language instructions for how the second LM agent is to handle a task, the second data indicating:
- a first instruction for the second LM agent to determine whether it is capable of handling a task indicated in a message from another LM agent,
- a second instruction to, in response to determining that the second LM agent is capable of handling the task, generate a first response to an other LM agent by processing the message using a second LM corresponding to the second LM agent, and
- a third instruction to, in response to determining that the second LM agent is not capable of handling the task, generate a second response to the other LM agent indicating that the second LM agent is unable to handle the task.

18. The first computer system of claim 13, wherein the at least one memory further comprises instructions that, when executed by the at least one processor, further cause the first computer system to:
- receive second input data;
- generate, using the first LM, third LM output data representing a second task to delegate to the second LM agent upon detection of an event;
- determine, using the third LM output data, second data corresponding to the second task;
- detect an occurrence of the event; and
- in response to detecting the occurrence, send the second data to the second LM agent, the second LM agent performing the second task in response to receiving the second data.

19. The first computer system of claim 13, wherein the at least one memory further comprises instructions that, when executed by the at least one processor, further cause the first computer system to:
- receive second data representing:
  - a first message format corresponding to messages from users, the first message format including a first portion indicating that a message is from a user and a second portion representing a natural language user input,
  - a second message format corresponding to messages from other LM agents, the second message format including a third portion identifying another LM agent and a fourth portion representing natural language generated by the other LM agent, and
  - a third message format corresponding to delegation requests to send to other LM agents, the third message format including a fifth portion identifying a delegate LM agent, and a sixth portion representing a natural language message to the delegate LM agent.

20. The first computer system of claim 13, wherein the at least one memory further comprises instructions that, when executed by the at least one processor, further cause the first computer system to:

receive second input data;

generate, using the first LM, third LM output data representing an application programming interface call to a software component;

receive, from the software component in response to the application programming interface call, an application programming interface response; and generate fourth LM output data using the application programming interface response and the first LM, the fourth LM output data representing a response to the second input data.

* * * * *